United States Patent
Manapat et al.

(10) Patent No.: US 12,327,251 B2
(45) Date of Patent: Jun. 10, 2025

(54) SYSTEMS, METHODS, AND APPARATUSES FOR IMPLEMENTING USER CUSTOMIZABLE RISK MANAGEMENT TOOLS WITH STATISTICAL MODELING AND RECOMMENDATION ENGINE

(71) Applicant: Stripe, Inc., South San Francisco, CA (US)

(72) Inventors: Michael Manapat, San Francisco, CA (US); Isaac Hepworth, Boulder, CO (US); Tara Seshan, San Francisco, CA (US); Mike Towber, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/125,390

(22) Filed: Mar. 23, 2023

(65) Prior Publication Data

US 2023/0230090 A1    Jul. 20, 2023

Related U.S. Application Data

(63) Continuation of application No. 17/119,069, filed on Dec. 11, 2020, now Pat. No. 11,620,652, which is a
(Continued)

(51) Int. Cl.
*G06Q 20/40* (2012.01)
*G06Q 10/067* (2023.01)
(Continued)

(52) U.S. Cl.
CPC ....... *G06Q 20/4016* (2013.01); *G06Q 10/067* (2013.01); *G06Q 20/405* (2013.01);
(Continued)

(58) Field of Classification Search
CPC .................... G06Q 20/405; G06Q 20/4016
See application file for complete search history.

(56) References Cited

U.S. PATENT DOCUMENTS 8,020,763 B1 * 9/2011 Kowalchyk ............ G06Q 30/06
705/40
8,666,861 B2    3/2014 Li
(Continued)

FOREIGN PATENT DOCUMENTS

| CN | 203192024 U | * | 9/2013 | ............. G06Q 20/04 |
| CN | 116956142 A | * | 10/2023 | |
| WO | WO20017044261 A1 | | 3/2017 | |

OTHER PUBLICATIONS

"Turner, A Model Explanation System: Latest Updates and Extensions, Jun. 30, 2016, Arxiv, entire document" (Year: 2016).*
(Continued)

*Primary Examiner* — Abhishek Vyas
*Assistant Examiner* — Adam Hilmantel
(74) *Attorney, Agent, or Firm* — Foley & Lardner LLP

(57) ABSTRACT

Systems, methods, and apparatuses for implementing user customizable risk management tools with statistical modeling and a recommendation engine within a computing environment are provided. A system may include, for example, means for evaluating the performance of a user rule for fraud prevention, in which the system receives a plurality of purchase transactions for the user; analyzes each purchase transaction received to generate a fraud likelihood score; receives the rule that specifies conditions when the
(Continued)

system is to accept or reject transactions regardless of the fraud likelihood score generated by the system; transmits a historical analysis to the user based on the received rule; receives an input from the user to activate the rule; monitors performance of the rule; and transmits a recommendation to the user to retain or cancel the activated rule based on the monitored performance. Other related embodiments are disclosed.

23 Claims, 23 Drawing Sheets

Related U.S. Application Data continuation of application No. 15/787,426, filed on Oct. 18, 2017, now Pat. No. 10,867,303.

(51) Int. Cl.
    *G06F 3/0482* (2013.01)
    *G06F 3/04847* (2022.01)
    *G06F 3/0488* (2022.01)

(52) U.S. Cl.
    CPC ........ *G06F 3/0482* (2013.01); *G06F 3/04847* (2013.01); *G06F 3/0488* (2013.01)

(56) References Cited

U.S. PATENT DOCUMENTS

| | | | |
|---|---|---|---|
| 9,760,861 B2 | 9/2017 | Boding | |
| 10,115,108 B1* | 10/2018 | Gendelev | G06Q 20/389 |
| 10,178,111 B1* | 1/2019 | Wilson | G06Q 20/4016 |
| 2011/0191138 A1* | 8/2011 | Saraf | G06Q 10/0635 |
| | | | 706/54 |
| 2012/0323783 A1 | 12/2012 | Canetto | |
| 2013/0282583 A1 | 10/2013 | Siddens | |
| 2014/0081652 A1* | 3/2014 | Klindworth | G06Q 10/0635 |
| | | | 705/2 |
| 2014/0089193 A1* | 3/2014 | Boding | G06Q 20/382 |
| | | | 705/44 |
| 2014/0258176 A1 | 9/2014 | Thorsen | |
| 2015/0379430 A1 | 12/2015 | Dirac | |
| 2017/0243224 A1 | 8/2017 | Kamal | |
| 2018/0253661 A1 | 9/2018 | Strauss | |
| 2018/0285878 A1 | 10/2018 | Jayanti | |
| 2019/0087737 A1* | 3/2019 | Pendar | G06F 17/18 |

OTHER PUBLICATIONS

Turner, Ryan, "A Model Explanation System," http://www.blackboxworkshop.org/pdf/Turner2015_MES.pdf, 5 pages.

Jason Shafrin, Disproportionate Stratified Sampling, Sep. 19, 2006, Healthcare Economist, entire document (Year: 2006).

* cited by examiner

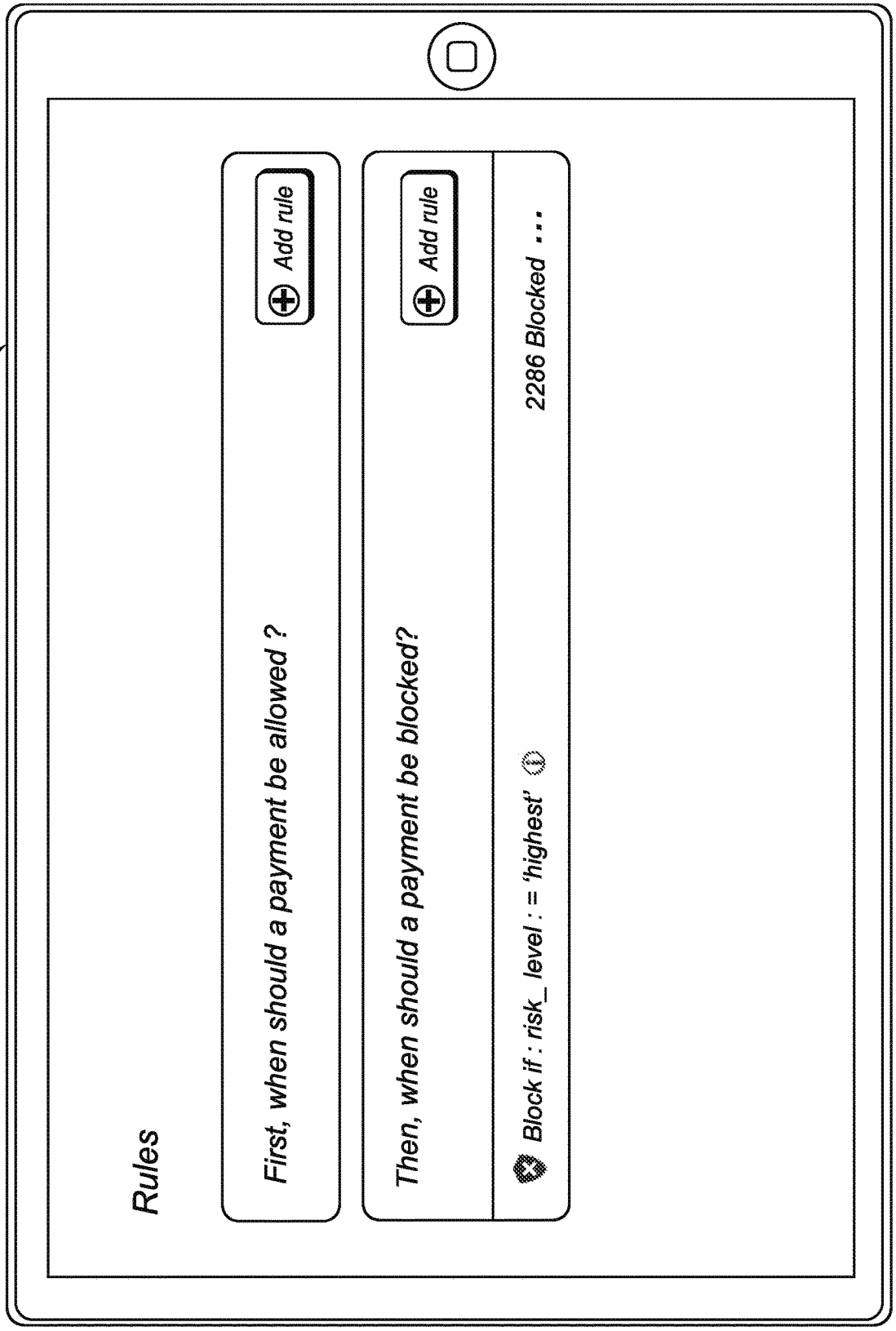

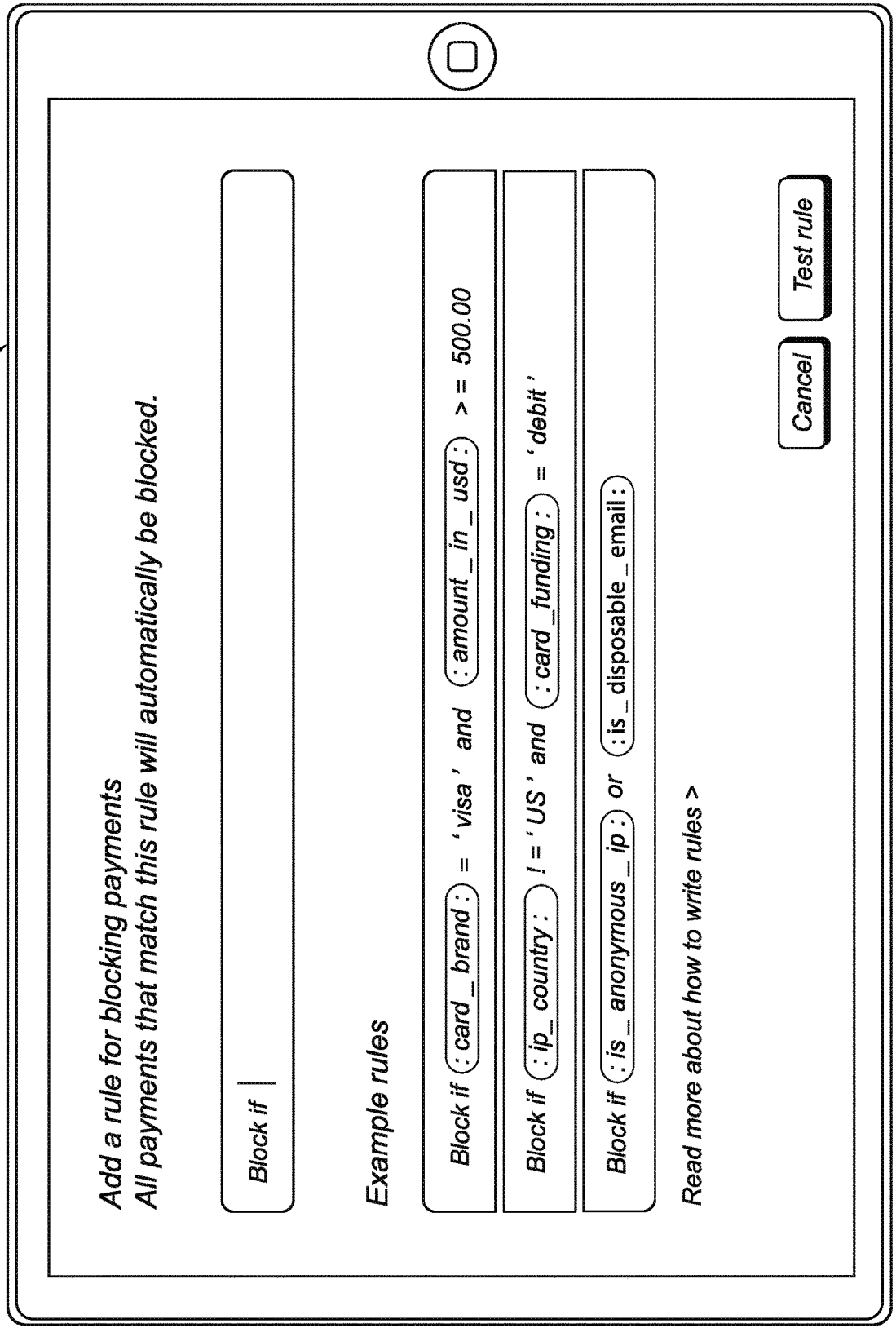

Fig. 4F

Tablet Computing Device 403 — 408 GUI

Add a rule for blocking payments
All payments that match this rule will automatically be blocked.

Block if ( :amount_in_usd: ) >= 200.00

Example rules

Block if ( :card_brand: ) = 'visa' and ( :amount_in_usd: ) >= 500.00

Block if ( :ip_country: ) != 'US' and ( :card_funding: ) = 'debit'

Block if ( :is_anonymous_ip: ) or ( :is_disposable_email: )

Read more about how to write rules >

Cancel    Test rule

Fig. 4G

409 GUI

Tablet Computing Device 403

Add a rule for blocking payments
All payments that match this rule will automatically be blocked.

Block if [ :amount_in_usd:  >= 200.00 ]

56 payments (1.4 %) matched this rule over the past 6 months.

| 9 | $7,370.00 | Authorized |
| 1 | $200.00 | Refunded as fraud or disputed |
| 46 | $22,690.00 | Blocked by rules or declined by issuer |

What did Payment Processor think of these payments ?

28 Normal Risk    6 Elevated Risk    22 High Risk

Cancel    Add and Enable

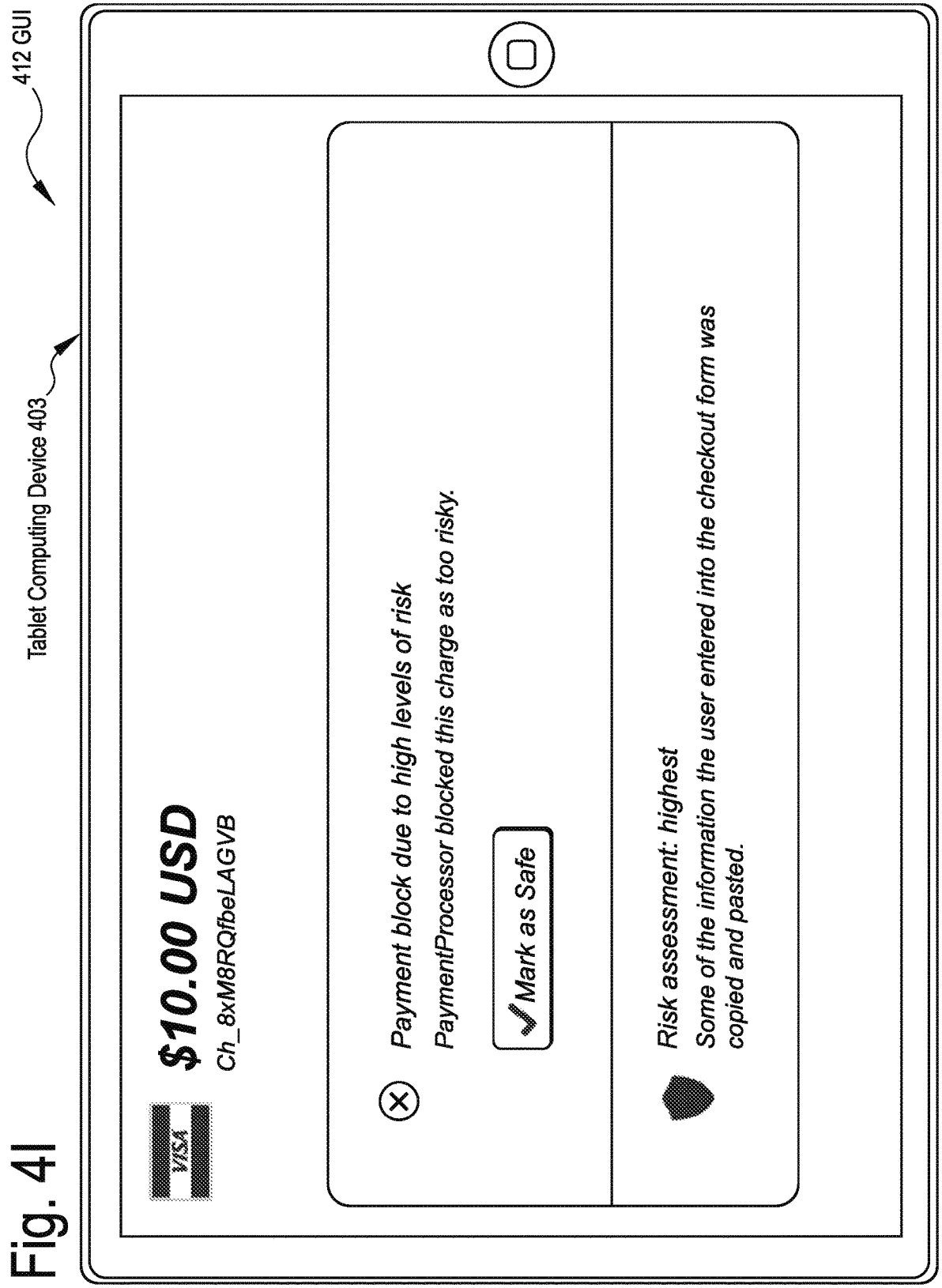

SYSTEMS, METHODS, AND APPARATUSES FOR IMPLEMENTING USER CUSTOMIZABLE RISK MANAGEMENT TOOLS WITH STATISTICAL MODELING AND RECOMMENDATION ENGINE

PRIORITY

The present patent application claims priority to and is a continuation of U.S. Pat. No. 11,620,652, issued on Apr. 4, 2023, which is a continuation of U.S. Pat. No. 10,867,303, issued on Dec. 15, 2020, the disclosures of which is are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing user customizable risk management tools with statistical modeling, and a recommendation engine within a computing environment supported by a processor and a memory to execute such functionality. Other embodiments relate to systems, methods, and apparatuses for generating explanations why attempted transactions are deemed to have a heightened expectation of being fraudulent. Embodiments may be implemented within the computing architecture of a hosted computing environment, sometimes referred to as an "on-demand" or a "cloud computing environment" through which clients, subscribers, users, or other parties may utilize the computing infrastructure of the payment system remotely, such as over a public Internet.

BACKGROUND

Merchants looking to accept payments online or in applications ("apps") often must trade off between having a high degree of control over their customers' experience, and the amount of investment into computing infrastructure and customized software necessary to accept payments online or in apps. Some minimize their investment by working with a third party payment provider to handle their payment needs. In these cases, the merchants commonly redirect their customers to the third party's payment acceptance page, which captures the customer's payment information and enables the third party to process the transaction. The third party subsequently pays the merchants for successful transactions, according to agreed terms.

While such an approach is often simple to implement, the merchant lacks control over the experience, often resulting in a very poor user experience. Moreover, such approaches often do not enable merchants to implement robust fraud prevention schemes, or merchant customizable fraud prevention criteria. Such conventional systems additionally lack the ability to provide user understandable explanations for attempted transactions that may be blocked by such fraud prevention schemes. Embodiments that provide solutions to these and other deficiencies in present state of the art are described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4D depicts an exemplary rule submission GUI via which a user may add rules in accordance with described embodiments;

FIG. 4E depicts an alternative rule submission GUI via which a user may add rules in accordance with described embodiments;

FIG. 4F depicts a rule submission GUI in which a rule is ready for submission and testing in accordance with described embodiments;

FIG. 4G depicts an alternative view of the historical analysis and testing GUI transmitted or displayed by the system when a user submits a rule for testing or submits a proposed rule to the system in accordance with described embodiments;

FIG. 4I depicts an exemplary manual rule review GUI via which a user may manually review held or quarantined rules in accordance with described embodiments;

DETAILED DESCRIPTION

Figure 1A:
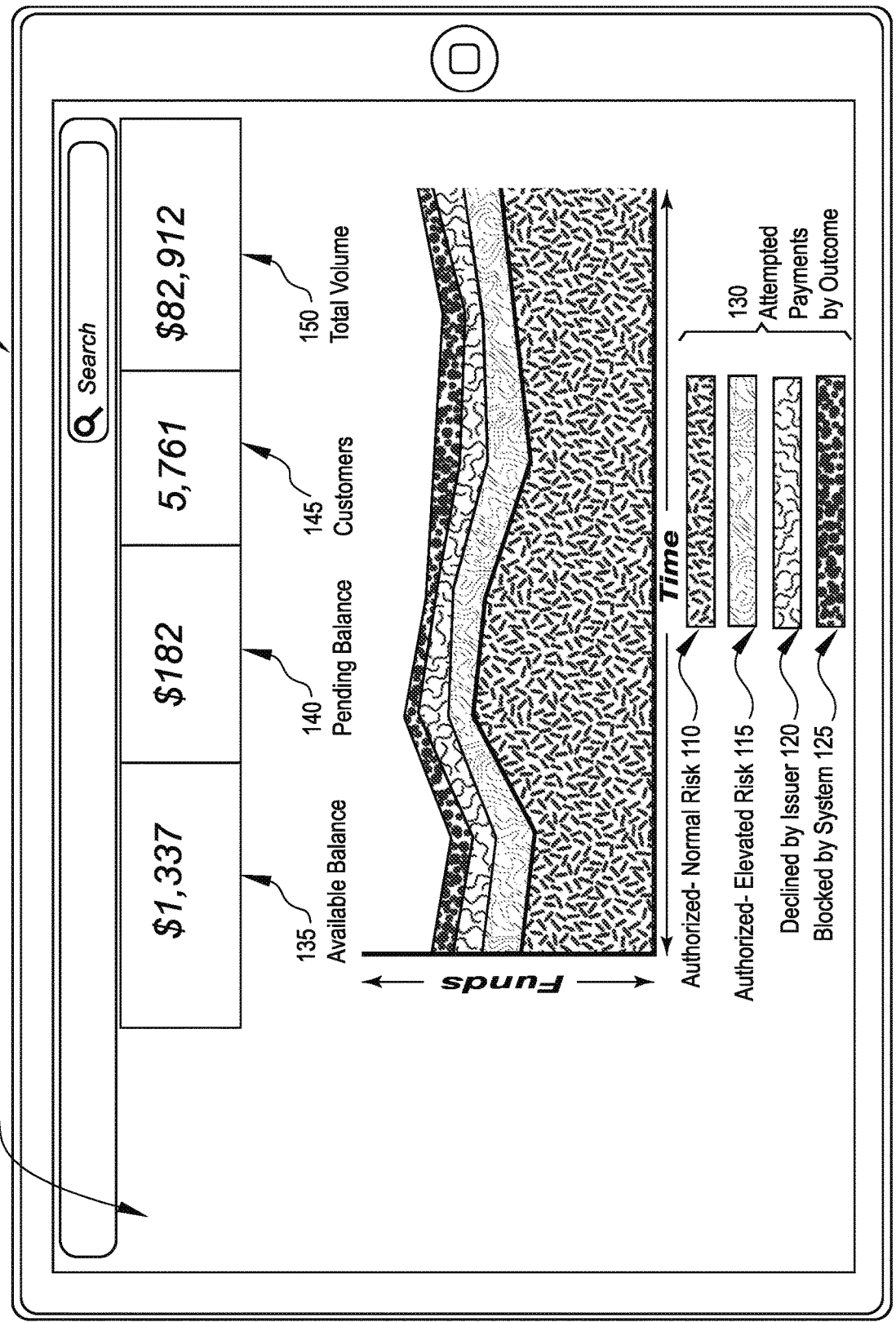
FIG. 1A depicts an exemplary Graphical User Interface (GUI) in accordance with described embodiments.

Described herein are systems, methods, and apparatuses for implementing user customizable risk management tools with statistical modeling and a recommendation engine within a computing environment supported by a processor and a memory to execute such functionality. An exemplary system may include, for example: means for evaluating performance of a rule defined by a user for fraud prevention, the means performed by a system having at least a processor and a memory therein to execute instructions, in which such a system includes means for: receiving a plurality of attempted purchase transactions for the user at the system; analyzing each of the plurality of attempted purchase transactions to generate a score indicative of the attempted transaction's risk level; receiving the rule at the system from the user, in which the rule specifies conditions defined by the user by which the system is to accept or reject purchase transactions for the user matching the conditions regardless of the score generated by the system; transmitting a historical analysis to the user based on the received rule; receiving an input from the user to activate the received rule at the system; monitoring performance of the activated rule; and transmitting a recommendation to the user to retain or cancel the activated rule based on the monitored performance of the activated rule.

Presently, many payment processors such as Stripe® of San Francisco, California implement fraud detection systems to evaluate each payment's risk level in real-time. Charges estimated to be a higher risk than a threshold are blocked. Such blocked transactions may be viewable by the users via a GUI (e.g., a web interface). Users conventionally have no indication that an attempted transaction that was authorized and processed by the system was nearly blocked (e.g., came close to the threshold but did not surpass it) or the inverse, that a transaction that was blocked was nearly permitted. Such transactions near a threshold cutoff may represent a business risk as they are often transactions for which the system is not highly confident that they either are or are not fraudulent.

The systems, methods, and apparatuses described herein protect users from fraudulent charges and additionally provide such users with tools and data to optimize their use of the system for their business. Provided tools reduce the user's operational burden of fraud while permitting such users to create customizable rules to fine-tune, and therefore override, the system's default fraud detection behaviors where desirable. The fraud risk assessment and actioning system uses machine learning to assess the risk of each attempted transaction and automatically blocks those transactions predicted to have an excessive risk of fraud, by comparing a generated fraud likelihood score (also referred to herein as a 'fraud score')—a numerical estimate of the probability that an attempted transaction is fraudulent—for the transaction to a permissible threshold. The mechanisms described herein provide users the ability to develop customizable rules to leverage their specialized and local knowledge while collecting statistical information on an ongoing basis for such rules and the transactions matching those rules, with the statistics forming the basis of making recommendations and providing feedback to the users with the ability to provide a continuous feedback loop by routing the gathered statistics and sample transactions back into the machine learning model to continuously improve the performance of the fraud detection system.

Through the practice of the disclosed embodiments, users are additionally provided greater insight into the metrics and reasons for decisions regarding those transactions permitted or those transactions rejected. For instance, merchants may plausibly desire to know the answers to questions such as: "How many charges were declined yesterday?" Or, "For what reasons were those transactions declined by the credit card issuer after being allowed to process?" Or, "How many transactions were blocked by the fraud detection system?" Or, "How many high risk or elevated risk transactions were allowed through?" Or, "How many disputes am I getting weekly, and what proportion of those disputes do I win?" Or, "How much did fraudulent transactions cost me last month in dollars and as a percentage of my total volume?" Conventional systems are often unable to provide such answers.

The fraud detection system evaluates attempted transactions and renders a prediction of risk, resulting in a fraud likelihood score (or "fraud score") for the transaction that may be correlated to a scale such as low risk, elevated risk, and high risk. In embodiments, the fraud likelihood score may be on a set scale (e.g., 0.0 to 1.0), where higher scores indicate a prediction that the attempted charge has a higher likelihood of being fraudulent. In other embodiments, the scale may instead be inverted, such that lower scores indicate a prediction that the attempted charge has a higher likelihood of being fraudulent. The scale may be divided into different tiers (e.g., 3 tiers) that correspond to, e.g., low, elevated, and high risk. For example, in an embodiment where higher scores indicate a prediction that the attempted charge has a higher likelihood of being fraudulent, scores between 0.00 and 0.33 (inclusive) may be considered to be low risk, scores between 0.34 and 0.67 (inclusive) may be considered to be elevated risk, and scores at or above 0.68 may be considered to be high risk. In embodiments, for charges at the far end of the risk spectrum, such as those charges scored as being high risk, the fraud detection system proactively blocks the attempted transaction and provides an indication to the user that the transaction has been blocked. However, according to certain embodiments, the system additionally enables an indication to the user when a transaction is not blocked, but is near the risk threshold at which point it would be blocked. According to such embodiments, the transaction may be flagged for further review (i.e., manual review) by the merchant or by a fraud expert.

According to certain embodiments, elevated risk transactions that fall below a risk threshold requiring they be blocked are instead routed to the user's dashboard where the user may manually approve or disapprove the transaction. According to such embodiments, the user's dashboard additionally provides an explanation or reasons for the allowance or rejection of attempted transactions, or the reasons for the attempted transactions requiring manual review. For instance, the system may display to the user's dashboard a primary risk factor for the transaction, such as: "We saw an unusually large number of cards used from this IP address (101.47.3.15) in the preceding hour." In alternative embodiments, multiple risk predicates are provided to the user responsive to an inquiry or dispute by the user for the transaction.

The reasons for a credit card issuer's decline of the transaction can be ambiguous, and even if a user has access to advanced decline codes for the credit card issuer, the decline codes are not persisted for the transaction's object itself, and conventionally required reference to an ephemeral error document. It is therefore in accordance with described embodiments that users are presented with a consolidated view of what happened to a charge and why. For instance, in a provided API and GUI dashboard available to users, the system gathers together all the relevant information the user may require to understand why a charge failed or succeeded along with understandable reasons and explanations derived from the risk model responsible for the transaction scoring and risk analysis of all transactions.

These and other benefits are described in greater detail below.

Certain terminology is used herein for convenience only and is not to be taken as a limitation on the present invention. Embodiments of the present invention are described in the context of an online payment acceptance service called Stripe® commercialized by Stripe, Inc., of San Francisco, California. The following definitions are provided to facilitate a better understanding of the described embodiments:

A "Card Network" refers to financial payment networks such as Visa®, MasterCard®, American Express®, Diners Club®, JCB® and China UnionPay®.

A "Processor" of payment transactions, as opposed to a "processor" or a "Central Processing Unit (CPU)" of a computing device, refers to a company (often a third party) appointed to handle payment transactions. Such Processors have connections to various card networks and supply authorization and settlement services to merchants or payment service providers. Processors may also move money from an issuing bank to a merchant or an acquiring bank.

An "Acquiring Bank" (or "acquirer") refers to a bank or financial institution that accepts credit and or debit card payments from affiliated card networks for products or services on behalf of a merchant or payment service provider.

A "Card Issuing Bank" (or "issuer") refers to a bank that offers card network or association branded payment cards directly to consumers. An issuing bank may assume primary liability for the consumer's capacity to pay off debts they incur with their card.

"Payment Information" refers to a wide variety of information which may be associated with payment of funds from a payor to a payee including, for example, primary account number (PAN) or credit card number, card validation code, expiration month and year, Automated Clearinghouse (ACH) transaction data, bank routing number(s), account number(s) for a bank specified by a routing number, etc. The payment information may include sensitive, non-public information or may include publicly available information, or more commonly, both.

A "merchant" refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor. A "Merchant Site" refers to a site (e.g., a website or mobile app) of the merchant where such products and services are licensed or sold.

In the following description, numerous specific details are set forth such as examples of specific systems, languages, components, etc., to provide a thorough understanding of the various embodiments. It will be apparent, however, to one skilled in the art that these specific details need not be employed to practice the embodiments disclosed herein. In other instances, well known materials or methods have not been described in detail to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems that are not directly discussed.

FIG. 1A depicts an exemplary Graphical User Interface (GUI) 100 in accordance with described embodiments. In particular, there is depicted GUI 100 at an exemplary tablet computing device 170 with a touch interface 105 mobile display upon which the user may search transactions via a search box and also observe the attempted payments by outcome 130 associated with the user's account. For instance, there are multiple variations of risk depicted via the key at the bottom of the chart, including authorized—normal risk at element 110, authorized—elevated risk at element 115, transactions declined by the issuer at element 120 and transactions blocked by the system as depicted at element 125. In this example, attempted transactions for which the fraud likelihood score feel within the predefined thresholds of either authorized—normal risk 110 or authorized—elevated risk 115 were approved, whereas for the other attempted transactions they were blocked either by the issuer or system. The chart itself depicts funds associated with each attempted payment type according to the key with the associated funds on the vertical axis over time on the horizontal axis.

At the top of the chart there are depicted various snapshot datapoints, including, for instance, available balance 135 representing funds available to the user, pending balance 140 representing those funds not yet settled or cleared to the user's account, number of customers 145 associated with the user's account over a user-defined timescale (e.g., year to date, this month, etc.), and total volume 150 associated with the user's account over a user-defined timescale. Such snapshot data points are customizable by the user's preferred dashboard to display, e.g., different timescales.

Figure 1B:
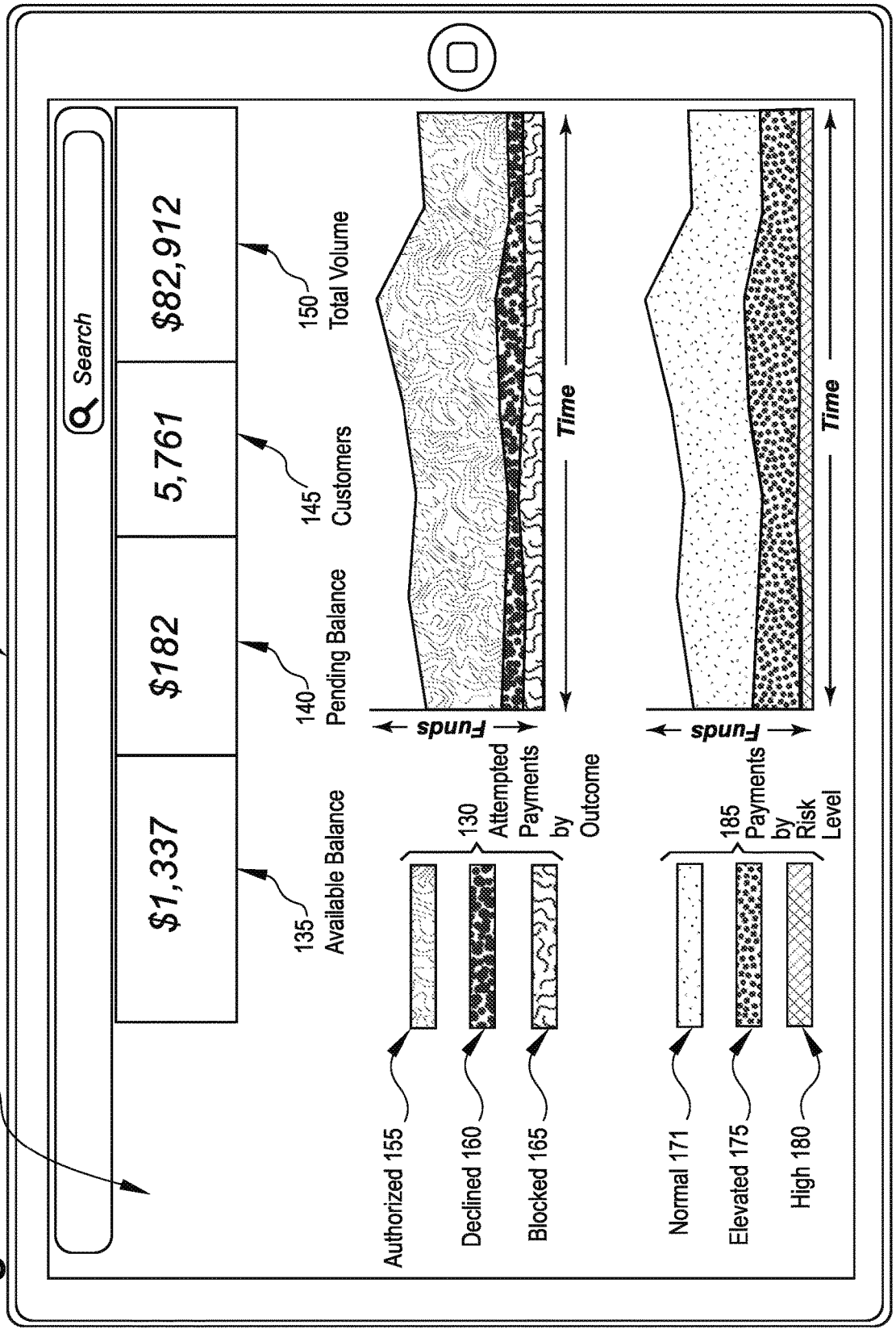
FIG. 1B depicts another exemplary GUI in accordance with described embodiments.

FIG. 1B depicts another exemplary GUI 151 in accordance with described embodiments. In particular, there is depicted GUI 151 at an exemplary tablet computing device 170 on a touch interface 105 mobile display that is a variation of the chart depicted in FIG. 1A. Here, there is again depicted the available balance 135, pending balance 140, number of customers 145, and total volume, as well as the attempted payments by outcome key 130 depicting those transactions authorized 155, declined 160, and blocked 165. As before, the chart depicts funds associated with each attempted payment type according to the key with the associated funds on the vertical axis over time on the horizontal axis. The second chart near the bottom depicts associated funds on the vertical axis over time on the horizontal axis for payments by risk level 185, in which there are depicted payments having a normal 171 risk level, payments having an elevated 175 risk level, and those payments having a high 180 risk level.

Figure 2A:
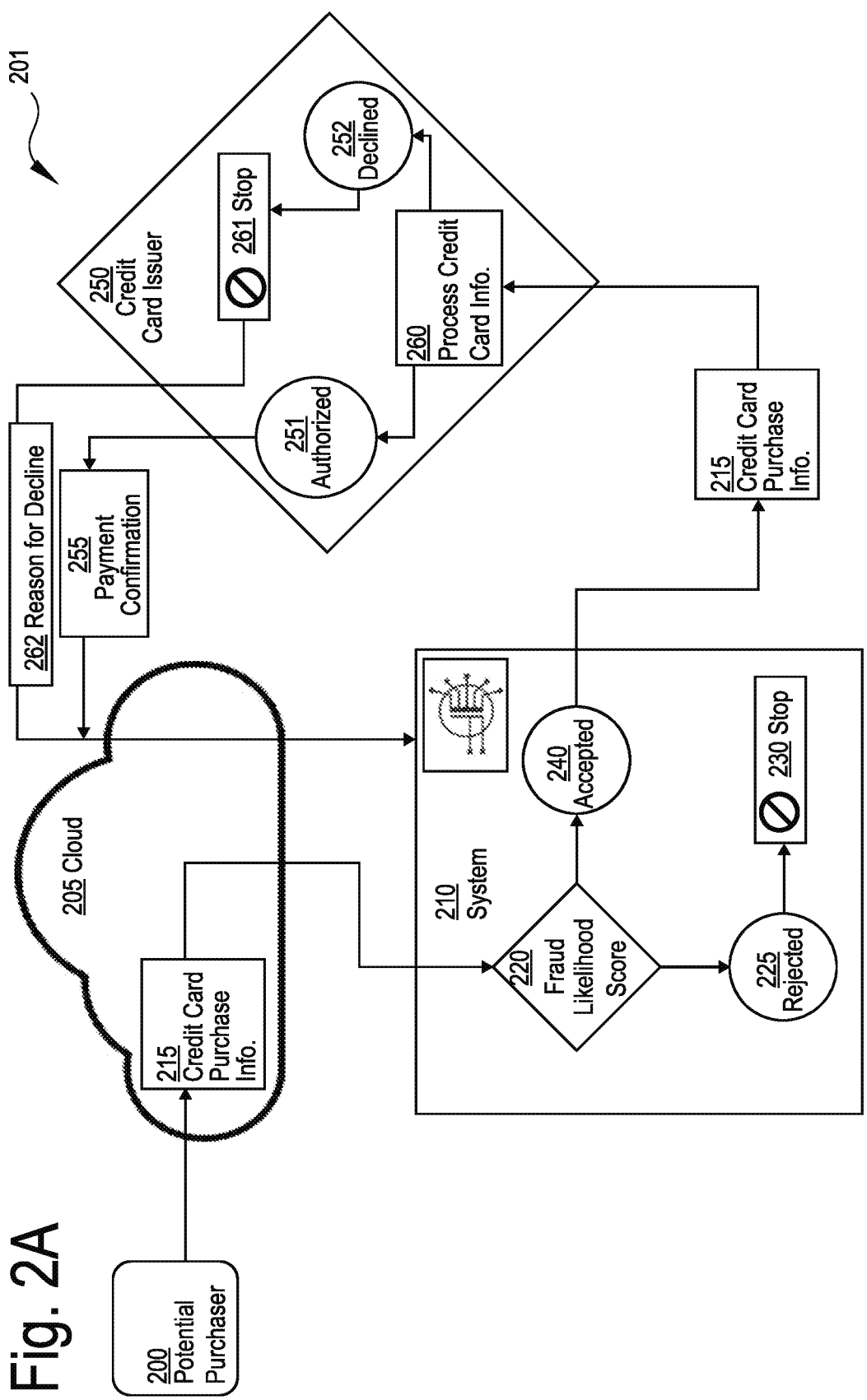
FIG. 2A depicts a system architecture in accordance with described embodiments.

FIG. 2A depicts a system architecture 201 in accordance with described embodiments. In particular, there is depicted the system 210 which communicates with a potential purchaser 200 via the cloud 205. For instance, system 210 may represent a hosted computing environment which is communicably interfaced with a plurality of user client devices, merchant client devices utilized by users, payor or payee client devices, etc. Such devices may be, for instance, mobile devices, smart phones, tablets, PCs, etc. Such devices may communicate with the system 210 via the cloud 205, for instance, communicably interfacing with network interface elements of the system 210 through a public Internet or through other networking architecture.

As depicted here, potential purchaser 200 communicates credit card payment information 215 via the cloud 205 to the system 210 where the transaction is then analyzed to determine a fraud likelihood score 220. Depending on the score, the transaction may be rejected 225 by the system 210 if fraud likelihood score 220 is above a predefined threshold, causing the processing to stop 230. Alternatively, the transaction may be accepted 240 if the fraud likelihood score 220 is below a predefined threshold, thus causing credit card payment information 215 to be routed from the system 210 to the credit card issuer 250 as depicted.

Notably, the credit card issuer 250 may also make its own assessment in processing the credit card information 253, meaning that the transaction may be declined 252 causing the processing to stop 261, or the transaction may be authorized 251 by the credit card issuer 250 causing the payment confirmation 255 to be issued and returned to the system 210 via the cloud 205. In the event the payment transaction is declined 252 by the credit card issuer, then the credit card issuer will additionally return a reason for the decline 262 determination to the system 210 via the cloud 205. For instance, such a determination may be returned via an API call between the credit card issuer and the payment system 210.

Additionally, it is not necessary for credit cards to be utilized for all payment transactions, as credit cards represent just one possible payment instrument type. There are hundreds of different payment types permissible (e.g., debit, ACH, cryptocurrencies, ApplePay, Klarna, PayPal, etc.), many of which will involve another third party separate from the system 210 additionally performing its own authorization or decline determination. System 210 performs fraud checking by analyzing incoming transactions regardless of whether they are credit card purchase transactions, ACH transactions, wire transfer transactions, Debit Card transactions, cryptocurrency transactions, or other kinds of transactions.

Figure 2B:
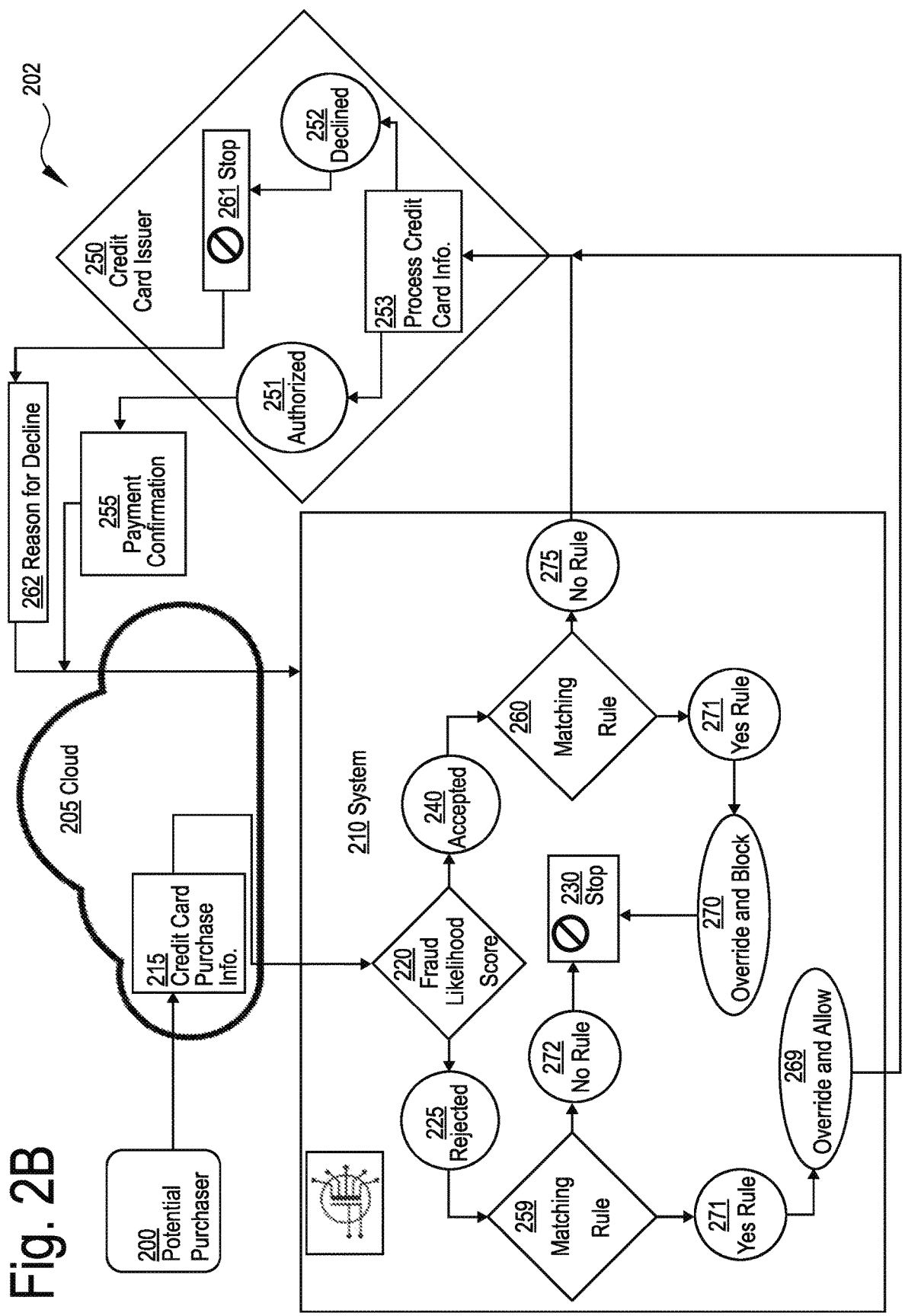
FIG. 2B depicts another system architecture in accordance with described embodiments.

FIG. 2B depicts another system architecture 202 in accordance with described embodiments. In particular, there is depicted the system 210 which communicates with a potential purchaser 200 via the cloud 205 as described before, however, the system 210 further depicts additional processing for a user rule active within the system 210.

As before, potential purchaser 200 sends credit card purchase information 215 to the system 210 via the cloud 205 where it is evaluated or analyzed such that the system 210 determines a fraud likelihood score 220. According to such an embodiment, the transaction is accepted 240 pursuant to the fraud likelihood score determined, meaning that the fraud likelihood score 220 is below a threshold for allowing the transaction, and then the system 210 checks for a matching user rule 260. If yes and there is a matching rule 270 to override and block the transaction, then processing stops and the transaction is rejected pursuant to the user rule regardless of the transaction having an acceptable or unacceptable fraud likelihood score as determined by the system 210. Alternatively, if there is no matching user rule 275 and the fraud likelihood score was accepted 240, then processing proceeds to the credit card issuer 250 which processes the credit card information 253 resulting in an authorized 251 or declined 252 transaction as before, with either the payment confirmation 255 or the reason for decline 262 being returned to the system 210 via the cloud 205.

In the preceding flow, matching the user rule 260 causes a system accepted transaction to be overridden by the user's specified conditions, thus permitting the transaction to be rejected regardless of the determination by the system 210. The opposite is likewise possible in which matching the user rule 259 causes a system rejected transaction to be overridden by the user's specified conditions, thus permitting the transaction to be accepted regardless of the initial determination by the system 210. Therefore, where the fraud likelihood score 220 causes the transaction to be rejected 225 by the system, flow proceeds to decision point 259 to determine if there is a matching user rule. If there is no rule, then processing stops with the transaction being rejected pursuant to the system's 210 determination. However, if there is a matching user rule 259 to override and allow the transaction, then processing proceeds to the credit card issuer to process the credit card information 253 as described previously.

According to a particular embodiment, when a transaction is received at the system 210 from a potential purchaser, the system generates a fraud likelihood score 220 for the transaction and then determines how to proceed by checking for a matching user rule (259 and 260) by the user associated with the transaction and that matches the conditions of the transaction. If there is no matching user rule (259 and 260) then the default behavior of the system 210 controls and the transaction is either rejected or accepted based on the system's determination of fraud likelihood score. However, where a rule exists and matches the conditions associated with the transaction in question then the system will apply the action specified by the user rule by overriding the default system behavior to either accept or reject the transaction. It is possible that many transactions will have a rule which matches the transaction but specifies the same action as the default behavior of the system, thus, a user rule may specify to allow a transaction already allowed by the system 210 and in a similar way, the merchant use rule may specify to reject a transaction already rejected by the system 210. Such occurrences are tracked by the system as part of ongoing monitoring and performance for an active rule and the system 210 may recommend to the user that a particular rule is not necessary because, for example, the system already rejects or accepts transactions in the same manner as specified by the user rule, and thus, it is not necessary to override the system's default behavior. For example, the system 210 may recommend that a particular rule be removed because it has not been used to override the default system behavior over a certain period (e.g., 180 days).

According to another embodiment, a manual review operation is performed as part of the processing flow, in which case attempted transactions are flagged for the user where, for instance, the transaction is evaluated by the system to have an elevated or high fraud likelihood score, in which case the user is prompted or solicited to manually review the transaction and manually allow or reject the transaction. Such manual review operations may be triggered regardless of whether or not a rule exists for the transaction.

Figure 2C:
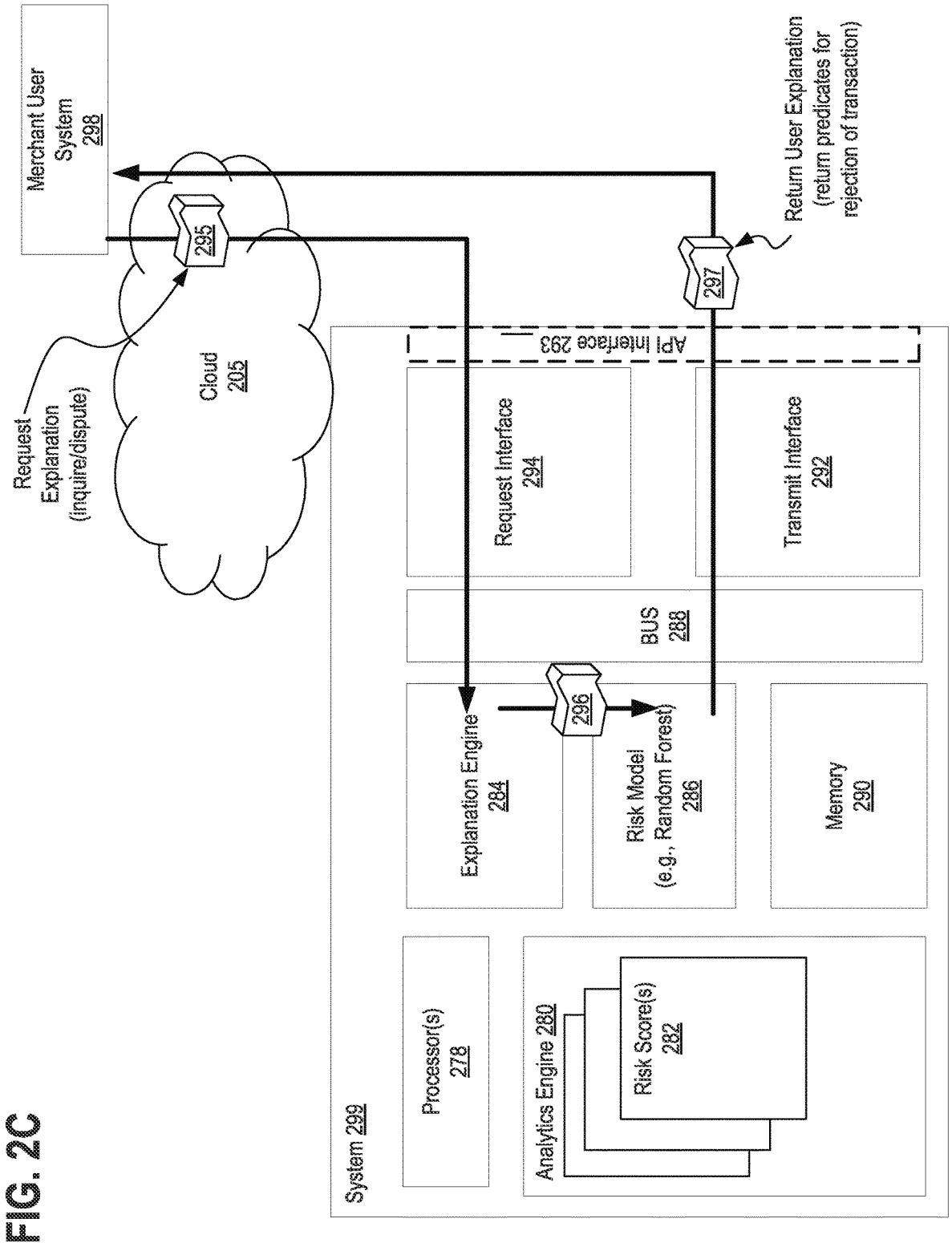
FIG. 2C depicts an exemplary system in accordance with described embodiments.

FIG. 2C depicts an exemplary system 299 in accordance with described embodiments. In particular, there is depicted system 299 which is connected with user system 298 via cloud 205. As depicted, user system 298 requests an explanation 295 (e.g., submits a transaction inquiry or dispute) to the system 299 via cloud 205 responsive to which the system 299 returns a user explanation 297 (e.g., returns predicates for rejection of the transaction).

Within system 299 there are one or more processors 278, memory 290, a bus 288 which interconnects the various components of system 299 and its peripherals, as well as a request interface 294 to receive the request 295 from the user system 298 and a transmit interface through which a response is returned from the system 299 to the user system 298. The requests and responses may be communicated between the user system 298 and the system 299 via the API interface 293 depicted as an optional component.

Additionally depicted within system 299 are the analytics engine 280 capable of generating fraud likelihood score(s) 282 for any transaction processed by the system and the explanation engine 284 and risk model 286 (e.g., a random forest model). The risk model 286 may respond to an inquiry 296 from the explanation engine by outputting predicates or user explanations for a rejection of a transaction which are then transmitted back to the user system 298 responsive to an incoming request for an explanation 295 from the user system 298.

According to certain embodiments, the model operates on the principle of random forests or random decision forests representing an ensemble learning method for classification, regression and other tasks. Such a model operates by constructing a multitude of decision trees at training time and outputting the class that is the mode of the classes (classification) or mean prediction (regression) of the individual trees.

According to particular embodiments therefore, the system analyzes the random forest model generated via the machine learning algorithms and derives a most likely explanation from the random forest for the fraud likelihood score generated. For instance, according to one embodiment, the random forest possesses a large number of features or attributes, such that every time a transaction is fraud likelihood scored, a multitude of such features are considered by the model. According to such an embodiment, the features correspond to attributes such as the card type (e.g., Mastercard, Visa, Discover, American Express, etc.) or the number of times that card has been utilized in the past N days across all users associated with the system, etc. According to one embodiment, in order to generate an explanation for the decision to reject or process the transaction, the system determines which of the many properties contributed a greatest amount to the resulting fraud likelihood score.

Consider the random forest as a collection of trees and at each tree a decision will be made based on the attribute. For instance, at the root of the forest may be a tree which asks "was the transaction a Visa credit card transaction?" If yes, then a yes branch is followed and if no, then the other branch is followed. Consider in this example, yes, the transaction was a Visa credit card transaction, and so the processing follows the yes branch to the right and then encounters another decision point asking "was this card utilized more than four times in the past 24 hours?" Again, if the answer is yes, then the yes branch is followed and if no then the no branch is followed. Eventually, after asking a multitude of such questions, processing ends up at a leaf which consists of all sample or past charges matching the same series of attributes. For instance, the sample may be a sub-set of past data or all past transaction data for a given range, etc. Regardless, at that leaf, the system then may determine that for all samples present at that leaf, 80 of the charges were not deemed fraudulent and 20 were ultimately determined to be fraudulent. With this information, the system generates the fraud likelihood score.

However, in order to determine what attribute contributes most to that resulting fraud likelihood score, the system takes both paths for the question "was the transaction a Visa credit card transaction?" Therefore, rather than taking the "yes" branch, both branches are followed as if it were unknown whether the transaction was a Visa credit card transaction. Then both branches are followed to the terminal leaf where a fraud likelihood score may then be established for each path, both the yes and the no, for the transaction's total collection of attributes without knowing whether or not the transaction was a Visa credit card transaction. The resulting fraud likelihood scores are then compared to determine their difference. A small difference may indicate that the branding of this transaction was not a large contributor to the score whereas a large difference may indicate that the card branding (e.g., Visa or otherwise) was a significant contributor. Next, both branches are then followed for the other remaining attributes. For instance, both the yes and no branches may be followed by the question, "was this card utilized more than four times in the past 24 hours?"

At the end of the processing, rather than having a single terminal leaf to generate the fraud likelihood score, a collection of leaves is obtained and then aggregating over all the leaves, say fifty total leaves collected, which attribute when omitted results in a greatest difference in the resulting fraud likelihood score. For example, say omitting the Visa branding from the analysis results in half the leaves being score fraudulent and half the leaves being scored not fraudulent. Consequently, it may be observed that the branding of the card, Visa or otherwise, is not an indicator of fraud. Rather, the attribute that, when omitted, maximizes the difference between the original score and a new non-determinate evaluated score when that feature is omitted may thus be considered to be a large contributor to the resulting fraud likelihood score or the resulting allowance of the transaction as non-fraudulent, depending on whether the inquiry is one of "why was this transaction rejected" or "why was this transaction allowed." In such a way, the identification of the attribute or feature which makes the biggest difference in the value of the score may be surfaced and output as the reason for the allowability or rejection of the transaction.

According to particular embodiments, an explanation engine 284 identifies the most likely one or more reasons contributing to a transaction rejection with increased granularity. For instance, the model may output an explanation for the transaction being marked as fraudulent because, by way of example, (a) the credit card brand was American Express and additionally (b) because the user of the credit card was in country x and (c) additionally because the credit card user swiped that identical credit card more than 10 times in the past day. In such a way, the collection of predicates together represents a joint reason the transaction was evaluated as excessively risky and thus flagged as likely fraudulent. Similarly, the explanation engine 284 may output these three reasons (a, b, and c) as user understandable reasons or explanations for the rejection of the transaction by the system.

According to such embodiments, the explanation engine may build the predicates one by one, individually over time by evaluating, for example, 1100 total transactions, of which perhaps 100 are fraudulent and 1000 were not found to be fraudulent. From such data, the explanation engine may identify the feature or characteristic of those transactions and the value which accurately explains the highest fraction of all the model outputs.

For instance, through an exhaustive search and comparison the explanation engine may identify a feature or characteristic such as "brand" of the credit card utilized and identify "American Express" as the value. By then filtering all of the values based on that predicate the explanation engine may then again seek to identify through search and comparison for any given transaction in which the card brand is American Express, which second predicate may be added to the first predicate that will once again yield the maximum accuracy as an indicator of likely fraud with accuracy being a function of both precision and recall.

Through iterative processing the explanation engine builds up the reasons or explanations for output to the user for any given transaction scored as fraudulent or conversely, for any transaction which is not scored as fraudulent but for which the reasons or explanation for why the transaction is not fraudulent is requested. Consider for instance the risk model 286 in conjunction with the analytics engine 280 renders a fraud likelihood score 280 and the user wishes to know why the risk model 286 returned that score, regardless of whether the transaction was rejected or permitted.

According to one embodiment, the explanation engine 284 may return feature importances which are those features and characteristics provided to user merchants as the reason(s) their transaction was blocked or processed (e.g., authorized) via the API 239. According to such an embodiment, the explanation engine 284 may output a list of all the trees within the risk model 286 and at which leaf the transaction of interest terminated at within the risk model 286. Such information is exhaustive, however, may be overly verbose and consequently return too much information to the user.

According to another embodiment, for each blocked charge, the explanation engine 284 associates a predicate to the blocked charge, such as:
    card_number_client_ip_address_24_all>3.5 & card_number_merchant_1_all>2.5

By doing so, the explanation engine 284 will output human-readable explanations of why the risk model 286 resulted in the charge being blocked (e.g., rejected) or alternatively why the risk model 286 permitted the charge to be processed.

According to a particular embodiment, the explanation engine 284 implements a predictive model that creates or outputs human readable explanations or "reasons" as to why the risk model 286 made the prediction resulting in the transaction being rejected or permitted. For instance, according to a particular embodiment, the explanation engine 284 provides as its output a set of explanations, each of which is composed of simple predicates (e.g. x>9) that are "anded" together. Such output is termed to be user understandable or "human readable" because the output is sufficiently simple and concise that an average non-expert human user can understand the reasons, rather than providing, for instance, 1000 predicates with a variety of weightings which may be exactly precise and actually utilized by the risk model 286, but which are not intuitive to an average user. Stated differently, the explanations (e.g., the predicates) returned as the output from the explanation engine's 284 query 296 to the risk model 286 and sent back to the user system 298 should be of a small enough number that a text description corresponding to or encapsulating each one may be displayed to the user via the user's dashboard. According to one embodiment, a maximum number of predicates returned to the user system is user configurable via user preferences whereas in other instances the quantity of returned predicates is system 299 configurable.

The explanation engine's 284 precision and recall, in terms of how close the returned user explanation 297 is when compared to the risk model's 296 predictive output is system 299 configurable. Consider for example, if the explanation (x>9 & y>10) covers 10% of the examples marked as fraudulent by the risk model 286, then it can be stated that the explanation engine 284 has a 10% recall. Similarly, if the explanation engine 284 matches 200 cases where the risk model's 296 predictive output predicted negative (e.g., not fraudulent), and matches 100 cases where the risk model's 296 predictive output guessed positive (e.g., yes, fraudulent), then it would be stated that the explanation engine 284 has 33% precision. A low precision explanation which is true for many negative cases is not likely compelling to a customer generating the incoming request explanation, and therefore, as high as precision as possible is sought from the explanation engine 284 while balancing the need for conciseness and simplicity in the returned user explanation 297.

According to one embodiment, the system 299 is configured to produce as high of a recall as possible for the entire set in which most positive cases correspond to a user understandable explanation, while permitting some individual explanations to have relatively low recall. With a set of explanations generated and the individual precision known for each explanation, the explanation then defines the best explanation for any particular transaction as the explanation with the highest precision whose predicates are all true for that particular transaction, and those predicates or that explanation is then returned to the user as the returned user explanation 297 output from the system 299.

According to one embodiment the explanation engine 284 is system configurable to select which explanation from many available explanations is chosen. For instance, between the predicates in an explanation and the number of possible features and splits for each predicate, there is a combinatorial explosion of possible explanations which may be attempted. While this quantity is theoretically feasible, exhausting all possible combinations is not computationally practical in terms of time and cost for the desired end result of returning a user explanation for a given transaction responsive to an inquiry. Because scoring an explanation involves the analytics engine 280 iterating over a training set, a heuristic set is utilized to prioritize or curate those explanations considered more promising. Therefore, according to such an embodiment, through an iterative approach, the "best" explanation is built for the entire training set, removing all positive cases already handled, and repeating until the entire set is covered or stopping when a useful explanation is attained. According to such an embodiment, negative cases caught are retained to enable more accurate assessment of the precision of future rules. Retaining the negatives permits the minimizing of false positives for future rules, even when another explanation has reported a false positive. According to certain embodiments, the risk model 286 is implemented via a tree model, although other types of models are feasible.

Figure 2D:
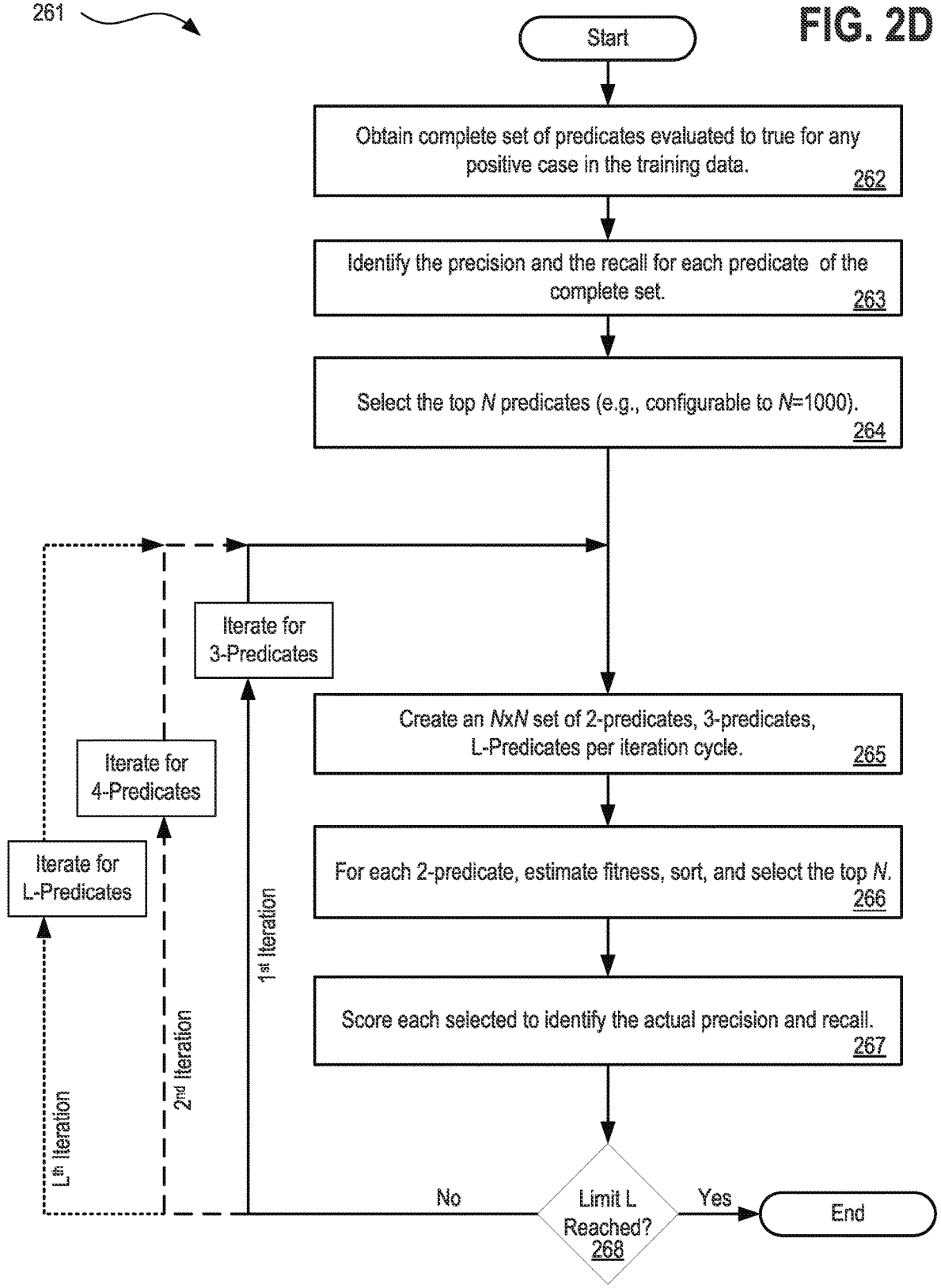
FIG. 2D depicts an exemplary flow diagram for identifying an explanation in accordance with described embodiments.

FIG. 2D depicts an exemplary flow diagram 261 for identifying an explanation in accordance with described embodiments. In particular, there is flow diagram 261 as implemented by the explanation engine 284 of FIG. 2C which operates to identify an explanation for a particular transaction, such that the identified explanation may be returned as the returned user explanation 297 to the user system 298 as depicted at FIG. 2C.

As shown here, processing begins with block 262 where processing logic obtains a complete set of predicates evaluated to true for any positive case in the training data. At block 263, processing logic then identifies the precision and the recall for each predicate of the complete set. At block 264, processing logic then selects the top N predicates (e.g., configurable to N=1000). For an initial 2-predicate cycle, processing logic at block 265 creates an N×N set of 2-predicates for the initial 2-predicate cycle. At block 266, processing logic estimates fitness, sorts, and selects the top N for each 2-predicate of the initial 2-predicate cycle. At block 267, processing logic then scores each selected to identify the actual precision and recall.

From block 267, processing proceeds to decision point 268 where it is determined if the limit L has been reached. If yes, the limit is reached, then processing ends. If no, limit L has not yet been reached, then processing iterates, for instance, a first iteration then proceeds to iterate for 3-predicates, with processing again traversing through blocks 265, 266, and 267 for the 3-predicates, a second iteration then proceeds to iterate for 4-predicates, and so forth until a final $L^{th}$ iteration iterates for L-Predicates, after which processing terminates according to reaching a configurable limit L at decision block 268. Through testing, a limit L between 4 and 7 has been identified as sufficient, however, this limit is system configurable. From the results the single predicate with the best precision is selected, the positive cases matching the training data are removed, and then the cycle is repeated.

A fitness function may additionally be utilized to normalize covariance between the explanation engine's 284 output and the risk model's 286 predications, weighted by its precision according to the exemplary formula:

$$f(E) = (\text{covariance}(E, \text{prediction}) / \text{variance}(\text{prediction})) * pr(E)$$

The normalized covariance returns a value in [−1, 1], higher if E changes with the predictions and in which any explanation having a positive value is deemed a reasonable explanation. Similarly, pr(E) will be in [0, 1], and it is therefore expected that f(E) will be in [0, 1] as well.

Ultimately an explanation is selected based on precision alone according to the above described process, however, alternatively selection schemes utilize covariance*precision for ranking which has been observed to return satisfactory results also as this prevents the precursor explanation from becoming overly specific as it is more difficult to construct useful large explanations in following operations when the precursor is too narrow.

Figure 3A:
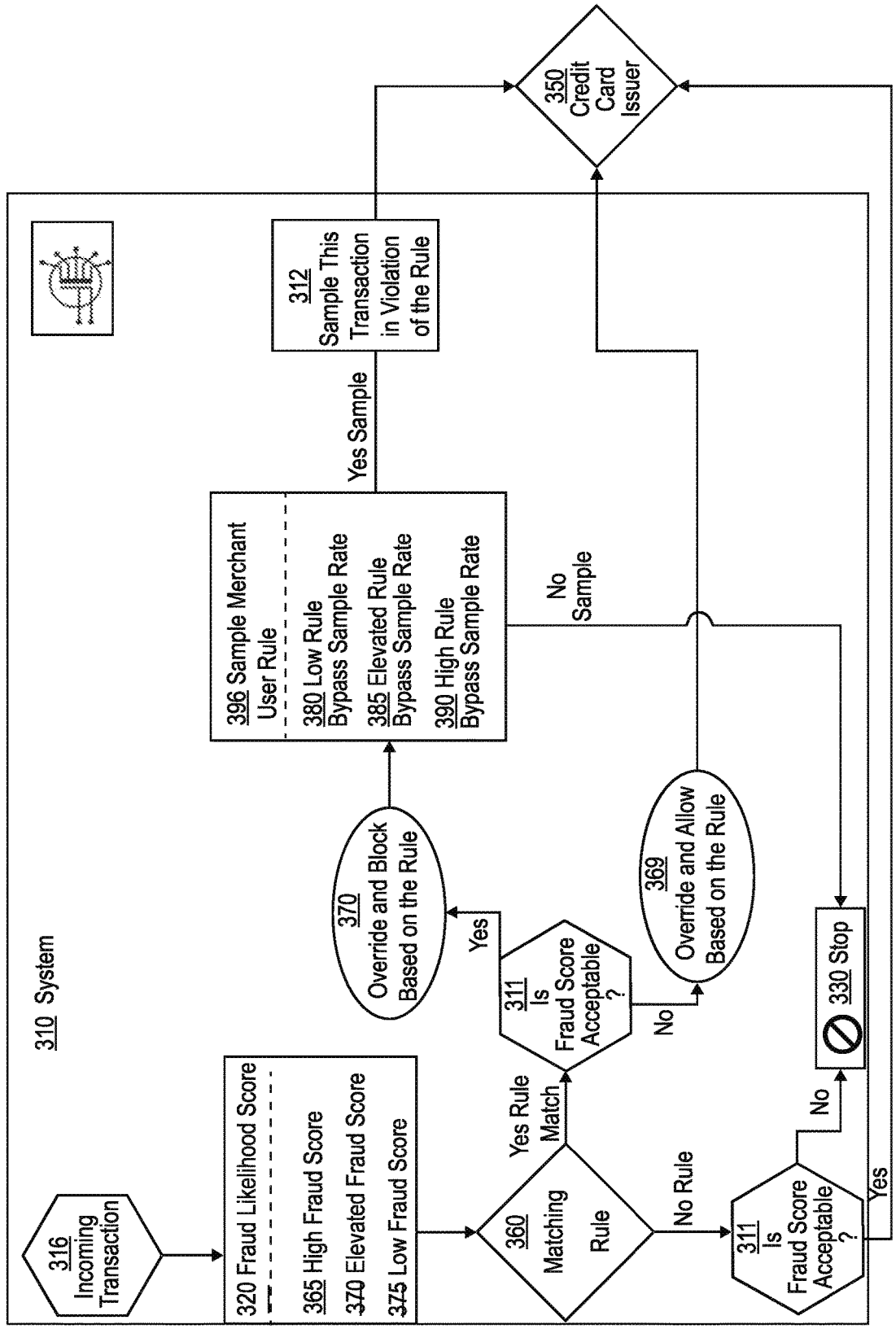
FIG. 3A depicts another system architecture and process flow in accordance with described embodiments.

FIG. 3A depicts another system architecture and process flow in accordance with described embodiments. In particular, there is depicted the system 310 which performs the various processing for a received transaction 316. In particular, when an incoming transaction 316 is received, the system analyzes the transaction to generate a fraud likelihood score 320. According to a particular embodiment, the system generates for every transaction one of a high fraud likelihood score 365, an elevated fraud likelihood score 370, or a low fraud likelihood score 375 according to the perceived risk of the transaction.

The system 310 then checks for a user rule matching the transaction to determine if the default behavior of the system will be overridden by a matching user rule 360. If there is no matching user rule 360 and the fraud likelihood score is acceptable 311, then processing proceeds to the credit card issuer 350 where the transaction is either authorized or declined as described previously in accordance with the default behavior of the system 310. If there is no matching user rule and the fraud likelihood score is not acceptable, then the system 310 rejects the transaction and stops 330 as its default behavior which is not overridden in the absence of a matching user rule. If, however, there is a matching user rule 360 specifying to override the system rejection and allow the transaction based on the rule (element 369), then processing proceeds to the credit card issuer 350 where the transaction is either authorized or declined as described previously.

When the transaction is authorized pursuant to a user rule to override the system's default behavior to reject the transaction, then the outcome of the transaction is tracked as part of the ongoing monitoring. For instance, it is possible the credit card issuer declines the transaction after the user rule override permits it to be allowed by the system 310.

Alternatively, it is possible that the credit card issuer authorizes the transaction which subsequently turns out to be fraudulent, in which case, such performance metrics may be provided as feedback to the user as part of the recommendation process indicating that an override of a system rejected transaction resulted in a fraudulent transaction being processed, ultimately costing the user due to the high likelihood of a chargeback by the credit card issuer. It is likewise feasible that an override due to a user rule causes a transaction to be processed by the system where it then proceeds to an issuer which authorizes the charge, and then is ultimately evaluated to be non-fraudulent. Such information is likewise tracked and is equally beneficial to the machine learning model.

As part of the ongoing monitoring by the system 310 it is necessary to track statistics and metrics for the performance of the user's activated rules. However, where the user rule specifies to reject a transaction, it is not possible to know whether or not transactions matching a user rule to override the system's 310 default behavior to allow a rule and instead reject transaction ultimately would have been fraudulent or resulted in a chargeback. Stated differently, if the transactions are rejected and never processed pursuant to the user rule, it cannot be knowable whether those transactions actually would have been fraudulent as they are never processed.

Accordingly, in embodiments the system 310 implements user rule sampling 396 for the transactions allowed by the system but for which there is a user rule specifying to reject the transaction overriding the system's default behavior. For instance, as depicted, the system 310 will implement a low rule bypass sample rate 380 for transactions having a high fraud likelihood score 365, the system will implement an elevated rule bypass sample rate 385 for transactions having an elevated fraud likelihood score 370 and the system will implement a high rule bypass sample rate 390 for transactions having a low fraud likelihood score 375.

Consider for instance a simple mechanism to implement sampling of the transactions in violation of the user's rule for the purpose of gathering statistical data and more particularly, to obtain an approximation of the distribution of charges and outcomes that would exist in the absence of intervention (e.g., blocking). For instance, to permit through some controlled fraction of charges that would ordinarily be blocked, the following sequence may be followed:

|   |      |                              |
|---|------|------------------------------|
|   | i.   | if score > 50:               |
|   | ii.  | if random.random ( ) < 0.05: |
|   | iii. | allow ( )                    |
| b.|      | else:                        |
|   | i.   | block ( )                    |

Therefore, in accordance with such an embodiment, when there is a matching user rule 360 and the fraud likelihood score is acceptable 311 (i.e., does not meet a predefined threshold), processing proceeds to element 370 to override and block the transaction based on the rule. Ordinarily, this would end the processing, however, so as to generate sampling statistics for such rejected transactions, processing instead proceeds to sample the user rule at block 396 according to the sampling criteria (e.g., high, elevated, and low sample rates according to the sampling rate specified such as 0.05 in the above example, though other rates may certainly be utilized). If there is no sampling to be applied, then the transaction is rejected pursuant to the user rule and processing stops 330. However, if the sampling criteria at block 396 specifies the transaction is to be sampled, then the transaction matching the user rule 360 for rejection will nevertheless be permitted to continue to the credit card issuer 350 in violation of the user rule 312.

The outcome of the transaction is then tracked similar to those transactions allowed pursuant to the user rule overriding the system's default behavior, however, because it is the system 310 making the determination to permit the transaction which a user rule specifies to reject, the system 310 will reimburse the user in the event the transaction results in a fraudulent transaction or a chargeback so as to compensate the merchant for the erroneous processing.

Recall and precision are additionally tracked and computed as necessary. Consider for instance, the following exemplary results for 1,000,000 charges:

|       |                 |
|-------|-----------------|
| i.    | 1,000,000 charges |
|       | score < 50.0    |
|       | score > 50.0    |
| ii.   | ------------------- |
|       | --------------------- |
|       | ---------- |
| iii.  | Total           |
|       | 900,000         |
|       | 100,000         |
| iv.   | Not fraud       |
|       | 890,000         |
|       | 1,000           |
| v.    | Fraud           |
|       | 10,000          |
|       | 4,000           |
| vi.   | Unknown         |
|       | 95,000          |
| vii.  | ------------------- |
|       | --------------------- |
|       | ---------- |

With this example, the total caught fraudulent charges are thus computed as (4,000*110.05), whereas the total fraud charges are computed as (4,000*110.05)+10,000. Consequently, the recall for this example is computed as 80,000/90,000=Recall, or simply 89%.

However, the processing which permits statistical sampling of the transactions in violation of the user rule enable the ongoing monitoring and performance tracking of the activated user rule which causes transactions to be rejected overriding the system's determination to allow the transaction.

According to one embodiment the recommendation engine as an output of the ongoing monitoring surfaces a confidence interval which is provided to the user as part of reviewing an active rule. For instance, the recommendation engine may provide feedback to the user that the rule in effect at the time blocks 10% of fraudulent charges, +/−1% in the case of a high volume merchant where sufficient statistical data are collected or perhaps the recommendation states that the rule in effect at the time blocks 10% of fraudulent charges, +/−5% in the case of smaller low volume merchants for which sufficient statistical data is not available.

According to one embodiment, the recommendation system additionally reports the effectiveness of the rule by comparing the results of the user's rule to the result the system's default behavior had the user's custom rule not been in effect the time. For instance, according to one embodiment, every transaction traversing through the system is analyzed to generate a fraud likelihood score by the system regardless of whether or not any rule matches the transaction. Consider for instance the user having a rule to block all charges originating from a particular country, such as Russia. For a stream of incoming charges, the first charge originating from Russia may be scored 0 (e.g., a low fraud likelihood score 375 with little predicted risk), whereas a subsequent charge from Russia may result in a fraud likelihood score of 50 (e.g., an elevated fraud likelihood score 370 with elevated risk), and a third transaction originating from Russia may then be scored as having a fraud likelihood score of 100 (e.g., a high fraud likelihood score 365 with high risk). Therefore, according to a particular embodiment, rather than sampling the transactions at a specified percentage, such as uniformly permitting 2% of all transactions matching the rule to proceed in violation of the rule, the recommendation engine performing the monitoring and sampling of the transactions samples varies the probability of sampling the user rule as a function of the underlying fraud likelihood score generated by the system 310.

For instance, where the user's rule specifies to simply block everything originating from Russia, the system's 310 recommendation engine performing the user rule sampling 396 may evaluate the score, and where the score is, for example, zero (0) and thus corresponds to a low fraud likelihood score 375, the recommendation engine will sample the transactions matching the rule with a greater frequency using the high rule bypass sample rate 390, for instance, permitting 20% of the transactions matching the rule but having been analyzed and corresponding to a low fraud likelihood score 375.

Similarly, where the system 310 analyzes transactions matching the rule and the risk is analyzed to be elevated, corresponding to an elevated fraud likelihood score 370, then an elevated rule bypass sample rate 385 may be utilized, for instance, sampling at 3%.

Where the system 310 analyzes transactions matching the rule and the risk is determined to result in a high fraud likelihood score 365, then a low rule bypass sample rate 380 may be utilized, for instance, sampling at half a percent (e.g., 0.50%). In such a way, a larger quantity of transactions will be permitted for the sake of gathering meaningful statistics as to the accuracy and effectiveness of the rule, however, the system is protected from excessive fraud exposure (as the system reimburses the user for sampling which results in fraudulent charges) by preferentially allowing charges that the system already considers to be no risk or low risk and by more strictly limiting those charges where the system's evaluation of risk considers the transaction to be high, and would therefore prevent the transaction from processing anyway.

Varying the probability of sampling the user's rule improves the system's traversals in the area sort of maximal uncertainty. For instance, if the fraud likelihood score is low to elevated, then by varying the sampling probability it is possible to both gather the relevant statistics while also controlling the investment budget allocated to reimbursements for resulting fraudulent charges. For instance, where it is desirable for the recommendation engine to reverse or sample $100,000 USD worth of charges per month across all users' rules for the purpose of gathering the statistical information, then by tuning or manipulating the sampling rates globally across all users the system can both collect the necessary data while adhering to the budgeted allocation.

While perhaps non-intuitive to permit high risk transactions through in the sampling, it is a necessary function of the sampling to prevent a bias in the resulting data which would result if only low risk transactions were permitted through as the system would reveal very little fraud in those sampled transactions as they had already been screened for risk. It is necessary to permit some elevated and high risk transactions through to yield a more statistically accurate and unbiased representation of the state of fraud and their distribution.

Because the high risk, elevated risk, and low fraud likelihood scores are permitted through at varying rates it is further in accordance with described embodiments that the weight each of the sample are varied so as to correct for the differing sampling rates. For instance, where a single charge having a score of 100 (e.g., high risk) is sampled and permitted to process through the system the weighting applied is then 1 over the probability, 1/100, or 1% of the time. Thus, for every transaction having a fraud likelihood score of 100 that were permitted through via the sampling rate there were 99 other transactions which were not permitted through. Therefore, in order to compute an unbiased performance of the user's rule, all of the sampled transactions are weighted according to their sampling rate to account for the non-uniform sampling from across the spectrum of fraud likelihood scores (e.g., high, elevated, low, etc.).

With such statistics gathered, the recommendation engine can then provide feedback to the user regarding the effectiveness and accuracy of the rule. For instance, the recommendation engine may provide feedback to the user stating that of all the X charges blocked by this rule, Y % were fraudulent (optionally with a confidence indicator) and this rule blocks Z % of total fraudulent transactions associated with the user's account. With these metrics and some comparison thresholds the recommendation engine may then additionally surface suggested actions to the user, such as cancel the rule, retain the rule, modify the rule, etc.

Further still, as fraud patterns change over time, the user will be advised automatically by the recommendation engine of the system as to those rules that should be modified or canceled, despite having been effective in the past, as they are no longer effective in the future and consequently may be costing the business valid sales opportunities. Helpful graphs and trend lines may additionally be provided to the user via the GUI to aid in the analysis of the effectivity and accuracy of the rule and to aid the user in reaching a determination as to whether or not to retain the rule in question. Other metrics provided as feedback to the user may be a quantity of those transactions which match the user's rule but would have been blocked by the system's fraud detection system as a default behavior, even in absence of the user's rule.

Another helpful metric may be an indication of a quantity of fraudulent charges as a ratio of legitimate charges also blocked by the rules to indicate to the user that while the quantity of fraudulent transactions is decreased the rate of fraud as a percentage of total volume may have been increased as a result of the rule, thus again representing a greater financial cost to the business due to lost legitimate sales opportunities.

Another recommendation may be a comprehensive recommendation for a particular user in which the recommendation indicates that for example, of the user's 20 active rules, only three of those active rules actually detected transactions not already identified by the system's fraud shield, and therefore, 17 of the 20 total rules may be wholly eliminated, thus simplifying the administrative burden on the user.

According to another embodiment the user provides their margin as an input and the recommendation engine then provides guidance or feedback indicating an how a less restrictive or a more restrictive rule may perform in terms of business profitability. For example, business owners obviously want to eliminate fraudulent transactions, however, increasingly strict filters will prevent an increasing number of legitimate transactions, and thus harm profitability, despite eliminating some risk of fraud. Evaluating the fraud rate for a given merchant in the context of that merchant's margin can therefore determine what level of fraud risk is ideal for maximum profitability of the merchant's business.

Ideally, the system would operate with sufficient user satisfaction that it is unnecessary for the users to create custom rules, however, the user community desires the increased control and capability of having custom user rule creation capability. Nonetheless, by providing ongoing monitoring at no cost to the users and gathering statistically relevant data as to the effectiveness and accuracy of the user's custom rules, it is possible to provide recommendations to the users to eliminate those rules which are not effective.

Moreover, the statistical data is additionally looped as input into the machine learning model for the fraud shield which generates the fraud likelihood scores for all transactions processed through the system, and thus, the fraud scoring module benefits from continuous learning and adapts to the changes in fraud patterns over time, thus permitting the default behavior to prevent even those potentially fraudulent transactions caught by the users' custom rules that escaped detection from the fraud shield's assessment of risk.

Figure 3B:
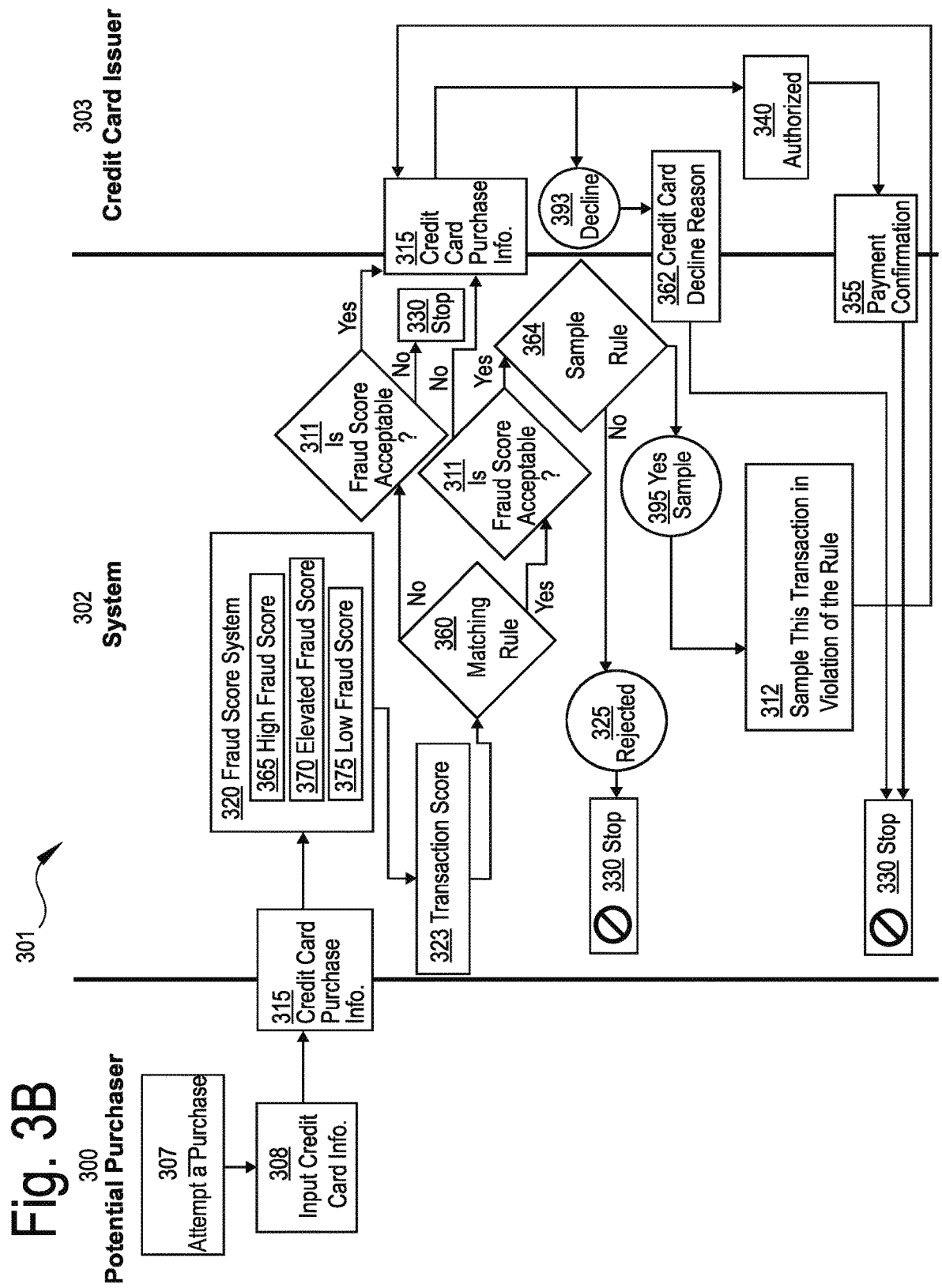
FIG. 3B depicts another system architecture and process flow in accordance with described embodiments.

FIG. 3B depicts another system architecture and process flow 301 in accordance with described embodiments. Three entities are depicted that engage in the processing of a purchase transaction, specifically, the purchaser 300, the system 302, and the credit card issuer 303. As depicted, a potential purchaser 300 attempts a purchase 307 and inputs credit card information 308. The credit card purchase information 315 is then passed from purchaser 300 to system 302 which performs analysis via the fraud likelihood score system 320 to generate a fraud likelihood score 323 corresponding to one of a high fraud likelihood score 365, an elevated fraud likelihood score 370, or a low fraud likelihood score 375.

The system 302 then checks for the presence of an active user rule 360. If there is no user rule 360 matching the transaction then the fraud likelihood score 323 is checked to determine if the fraud likelihood score is acceptable 311. If the fraud likelihood score is not acceptable 311, then processing stops 330 in accordance with the system's 302 default behavior.

If however, yes, the fraud likelihood score is acceptable, then the credit card purchase information 315 is passed to the credit card issuer 303 to either decline 393 and return a credit card decline reason 362 back to the system 302 where processing then stops 330 or alternatively, the credit card issuer 303 will authorize 340 the transaction and return payment confirmation 355 to the system 302 where processing then stops 330.

Conversely, when the system 302 checks and determines there is a user rule 360, then if the fraud likelihood score is not acceptable 311 but there is a matching user rule 360, then processing proceeds to pass the credit card purchase information 315 to the credit card issuer 303 due to the user rule overriding the system's 302 default behavior to reject the transaction and instead permitting the transaction to be processed based on the user rule. The credit card issuer then declines or authorizes the transaction as described previously.

If, however, the system 302 checks and determines there is a user rule 360 and the fraud likelihood score is acceptable 311 but the matching user rule 360 requires the system 302 to reject the transaction despite the acceptable fraud likelihood score, then processing instead proceeds to decision point 364 where it is determined whether or not to sample the user rule 364 either according to a high, elevated, or low sample rate.

If there is no sampling, then processing proceeds from decision point 364 to reject 325 the transaction and processing stops 330. Alternatively, if yes 395 (sampling is to occur), then processing proceeds from decision point 364 to block 312 where the transaction is sampled in violation of the rule and processing then proceeds to pass the credit card information 315 to the credit card issuer 303 which then declines or authorizes the transaction accordingly.

Figure 4A:
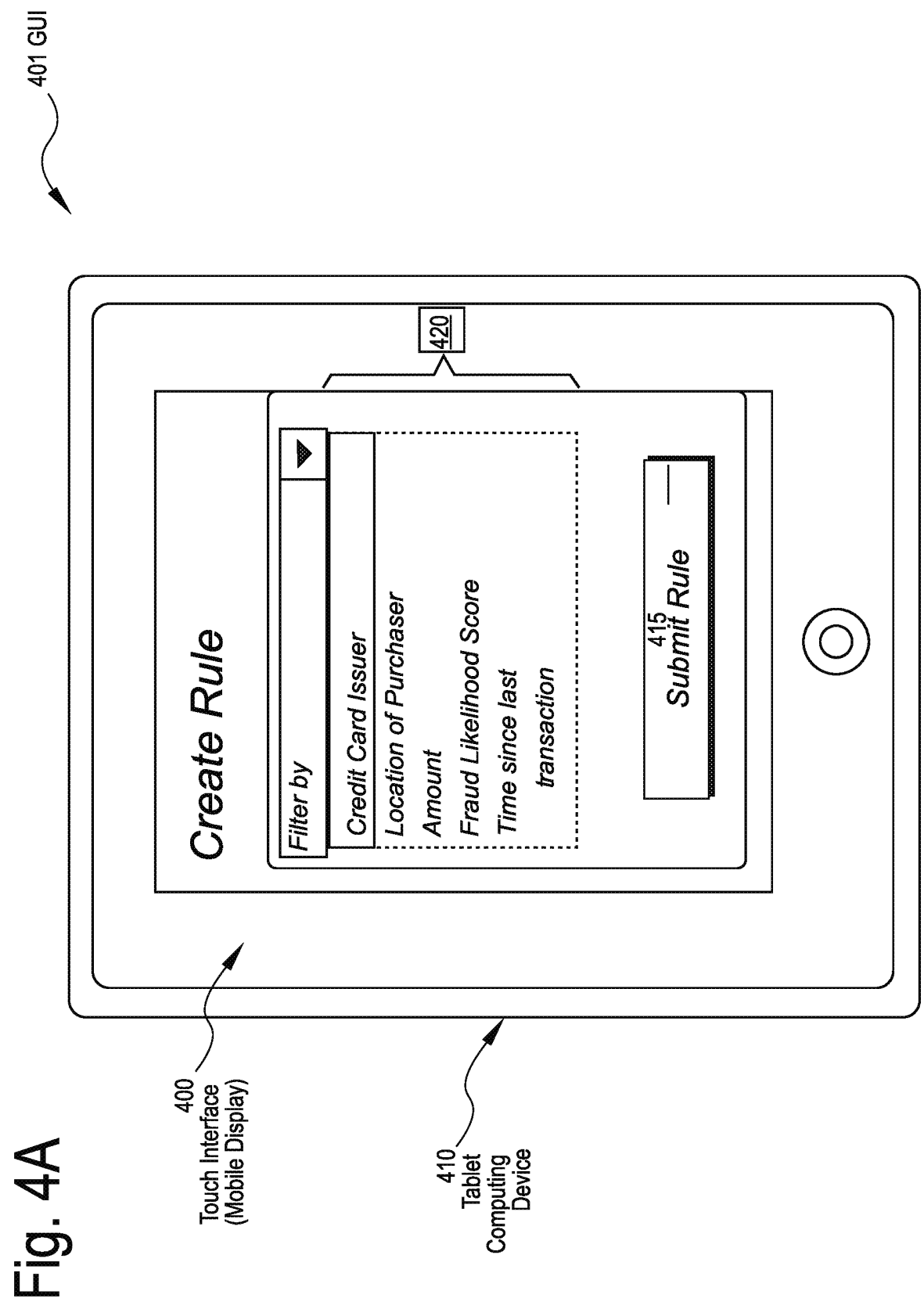
FIG. 4A depicts a GUI via which a user may create a new rule.

FIG. 4A depicts a GUI 401 via which a user may create a new user rule. In particular, there is depicted the GUI 401 at the touch interface 400 (mobile display) of the tablet computing device 410 through which the user may select from a variety of filter by 420 criteria to generate a rule and then submit the user rule 415.

According to described embodiments, users are enabled to specify and activate their own rules to be enforced by the system. Such rules may be enforced by the system even when contrary to the risk analysis and resulting fraud likelihood score generated by the system. For instance, users may specify and activate rules which are nuanced or more specific to their particular business based on their own judgment. The system provides an interface to the users through which they may create rules, review how such rules would have affected past transactions, and ultimately then activate the user rule if the user wishes to do so. The system will then monitor the activated rule, collecting statistics and actual usage results, and then surface recommendations to the user with regard to the effectivity of the rule, again permitting the user to either keep or cancel the rule based on the system feedback.

Exemplary rules vary widely, but may include criteria such as charges less than $10.00, charges made utilizing pre-paid cards, charges made where the issuing country of the card does not match the country from which the transaction originates, non-domestic charges greater than $1,000.00, charges from Russia or any other specified country or group of countries, charges of "elevated" and/or "high" risk level as assessed by the fraud likelihood score system (e.g., element 320 of FIG. 3B), charges having a fraud likelihood score exceeding a specific threshold set by the user regardless of the threshold utilized by the system, etc. Any of the criteria may then correspond to an action such as always block, always allow, hold for manual review, and so forth.

Consider for instance a merchant wishing to institute a particular block for transactions originating via credit card transactions from, e.g., Singapore, or conversely, expressly permitting transactions originating from Singapore. Such a user may specify filter criteria 420 specifying that transactions specifically associated with that user's account which originate in Singapore and which match any additionally specified criteria (e.g., amount, number of times card used, card present or not present, branding, fraud likelihood score range, etc.) will either be affirmatively permitted, or rejected, regardless of the risk determination by the system. In such a way, the system provides a visual GUI interface (e.g., accessible via the user dashboard), through which users may specify custom user rules for transactions associated with their account. Such rules may override the system determination or may augment the system determination according to the criteria specified and activated by the user. Consider for example a merchant which experiences an unusual number of fraudulent transactions originating from country X. Such a user may click on a particular transaction, corresponding to a fraudulent transaction having originating in that country, and then navigate to the rule creation GUI 401 where the country in question may be specified in addition to other criteria.

Figure 4B:
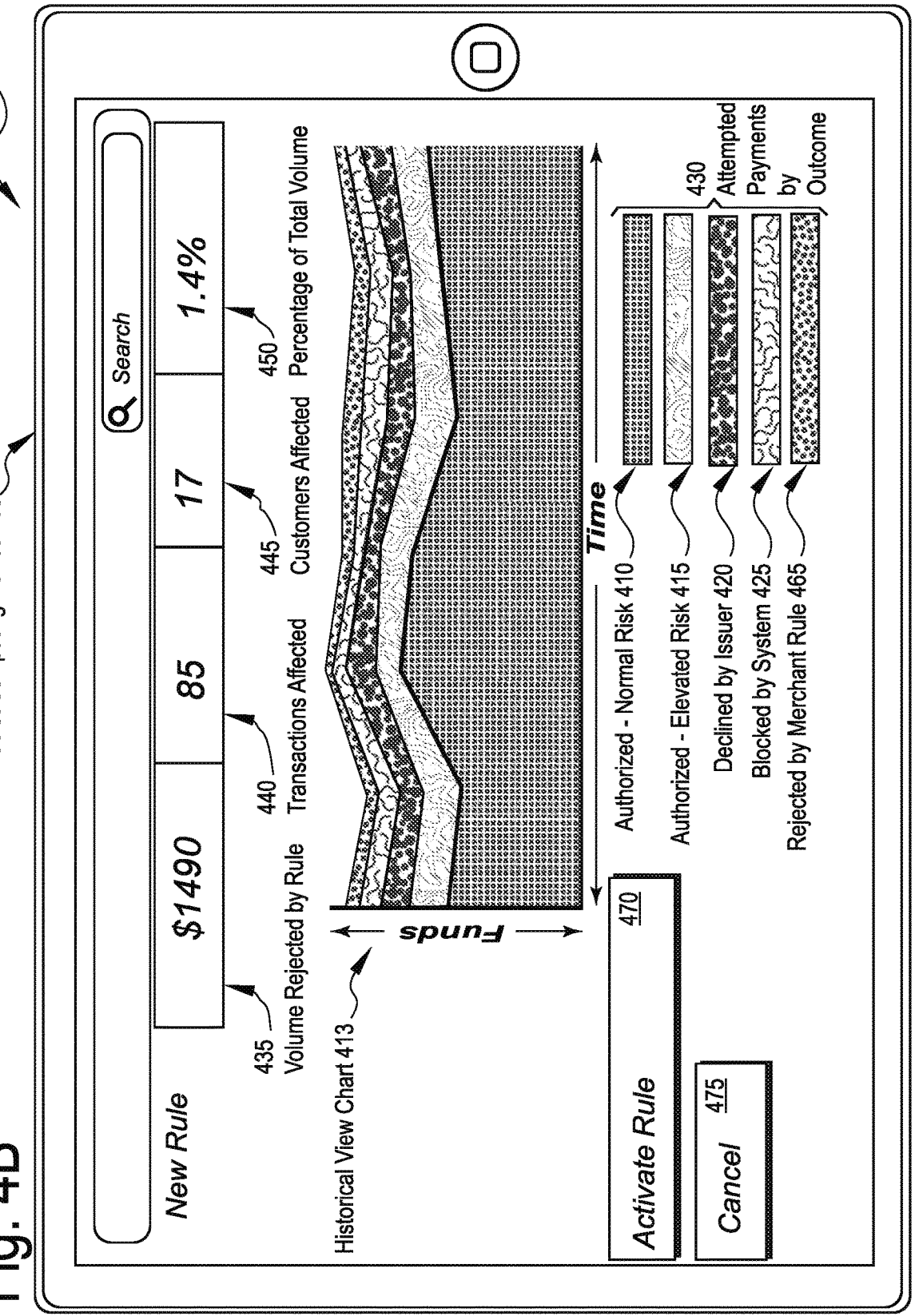
FIG. 4B depicts a GUI via which a user may activate a new rule.

FIG. 4B depicts a GUI 402 via which a user may activate a new user rule 470. In particular, there is depicted the GUI 402 at the tablet computing device 403 depicting a historical view chart 413. Within the chart there is depicted a "what if" analysis showing the historical view of what would have occurred if the newly created rule from FIG. 4A were actually in place and activated over a past historical period of time.

Depicted at the top are snapshot data points including volume rejected by the rule 435 over a particular time period (e.g., 90 days), transactions affected 440 by the rule had it been activated over that period, customers affected 445 by the rule had it been in effect, and percentage of total volume 450 affected by the rule had it been in effect. The graph depicts funds on the vertical axis over time on the horizontal axis according to the key at the bottom showing the attempted payments by outcome 430 in which there are authorized—normal risk 410 transactions, authorized—elevated risk 415 transactions, transactions declined by the issuer 420, transactions blocked by the system 425, and those transactions rejected by the merchant rule 465. Once the user reviews the historical view chart 413 showing the "what if" results of the proposed but not yet activated user rule, the user may then either cancel 475 the proposed rule without activation or the user may activate the user rule 470.

Continuing with the example from above, before the user enables the new user rule for transaction originating from country X, the user is presented with the historical view chart 413 which shows which transactions and what volume of revenue would have been affected by the proposed rule had that rule been active over a past period of time, such as 3 months, 6 months, or whatever timeframe the user wishes to review after the system provided default time frame is presented. Through the historical view chart 413 the user may observe the effectivity of the rule over the past displayed time frame had the rule been active. Notably, the historical view chart does not affect actual transactions processed, but does provide the user with guidance as to what effect the rule would have had, if the rule had been active.

Figure 4C:
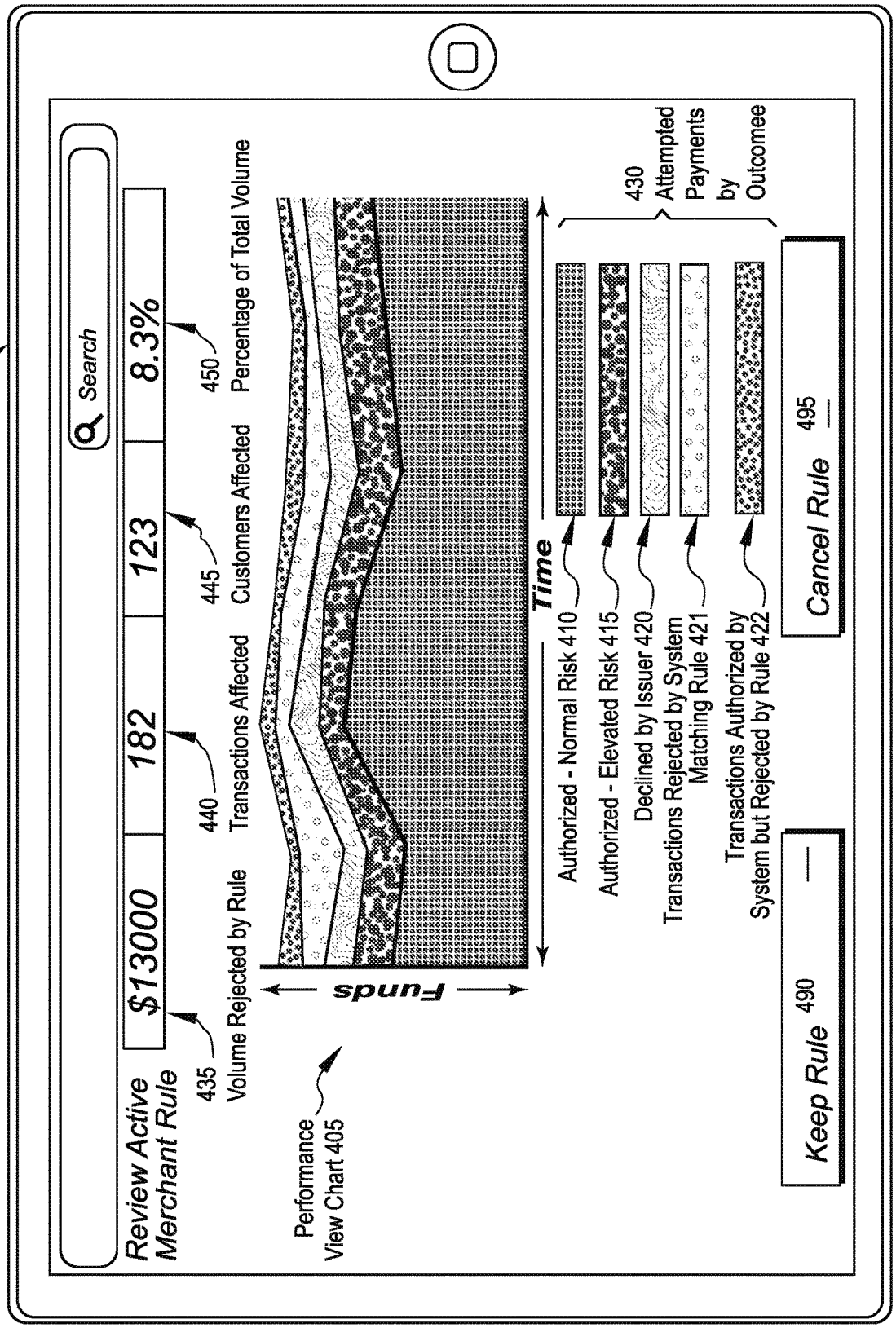
FIG. 4C depicts a GUI via which a user may review performance of an activated rule and either keep or cancel the rule in accordance with described embodiments.

FIG. 4C depicts a GUI 404 via which a user may review performance of an already activated user rule 470 and either keep or cancel the user rule. In particular, there is depicted the GUI 404 at the tablet computing device 403 depicting a performance view chart 405. Within the chart there is depicted the actual performance of the active user rule over a past period of time. As before, depicted at the top are snapshot data points including the actual volume rejected by the rule 435, actual transactions affected 440 by the rule, number of customers affected 445 by the rule presently in effect, and a percentage of total volume 450 affected by the rule in effect. The graph depicts funds on the vertical axis over time on the horizontal axis according to the key at the bottom showing the attempted payments by outcome 430 in which there are authorized—normal risk 410 transactions, authorized—elevated risk 415 transactions, transactions declined by the issuer 420, transactions rejected by the system (e.g., blocked) as matching the user rule 421, and those transactions authorized by the system but rejected by the merchant rule 422. After review, the user may elect to either keep the user rule 490 or cancel the user rule 495.

FIG. 4D depicts an exemplary rule submission GUI 406 via which a user may add customized user rules. In particular, there is depicted the GUI 406 at the tablet computing device 403, a rules submission screen via which a user may submit rules to permit payments to be allowed, overriding the system's default behavior and additionally permitting the user to submit rules to cause payments to be blocked, again overriding the system's default behavior. At the bottom of the GUI 406 interface there are indicated helpful rule creation "hints," which provide additional context appropriate information when selected by the user. For instance, the user presently has one active rule being enforced in which the active rule is shown at the bottom of the GUI 406 which is to "block if" the risk level is determined by the system to be "highest." The GUI 406 indicates that there have been 2286 matching transactions blocked by the active rule and there is additionally an information dialog to display additional information regarding the currently enabled rule.

FIG. 4E depicts an alternative rule submission GUI 407 via which a user may add customized user rules. In particular, there is depicted the GUI 407 at the tablet computing device 403 a rules submission screen via which a user may type free form rules which provides a more powerful and customizable rule creation screen but does add some additional complexity and is therefore more suitable for advanced users. Nonetheless, users may select rules which have conditions and modifiers and comparisons for the various possible objects affecting processing of payments. At the bottom there is a link to read more about the rule creation process and several examples are depicted including rules to block if the brand matches, for example, "visa" and the amount equals or exceeds $500.00 or another exemplary rule to block if the IP origination point is in a specific country and where the source of funding is debit, or alternatively the last example shows to block where the IP is anonymous or the email is a disposable email address (i.e., if the email address supplied with the payment is one used with a known throwaway email address provider).

Once created, the user may either cancel or "test" the rule by selecting the test button at the bottom, which will check to determine if the rule structure is syntactically correct and additionally present the historical analysis showing the affects of such a rule on past transactions as if the rule had been in effect for a past historical period of time.

FIG. 4F depicts a prior rule submission GUI 408 partially completed and ready for rule submission and testing in accordance with described embodiments. As can be seen here, the user has entered a proposed free form rule to:

Block if :amount_in_usd: >=200.00

A user may choose to set such a threshold if, for example, the average purchase made is small (e.g., $15), such that very large purchases are likely to be fraudulent.

FIG. 4G depicts an alternative view of the historical analysis and testing GUI 409 transmitted or displayed by the system when a user submits a rule for testing or submits a proposed rule to the system. In particular, the GUI 409 at the tablet computing device 403 shows the rule submitted in the top portion indicating that a transaction is to be blocked if the amount in U.S. dollars exceeds or is equal to $200.00. In the middle section the GUI 409 indicates that 56 payments, or 1.4%, of the user's transactions over the past six months would have matched the proposed rule, with a breakdown additionally depicting that of those 56 payments that match the proposed but not yet active rule, nine (9) would have been authorized, one (1) would have been refunded as fraud or disputed, and lastly, 46 would have been blocked by the rules or declined by the issuer. In the bottom section there is a breakdown of the risk analysis by the system, indicating that 28 of the matched payments were identified as normal risk, with six (6) having medium or elevated risk, and lastly, 22 of those payments corresponding to a generated fraud likelihood score by the system as having high risk. After review of the proposed rule and the affect of such a rule on the user's transactions over a past historical time period, the user may either cancel the proposed rule or add and enable the rule to be enforced by the system.

Figure 4H:
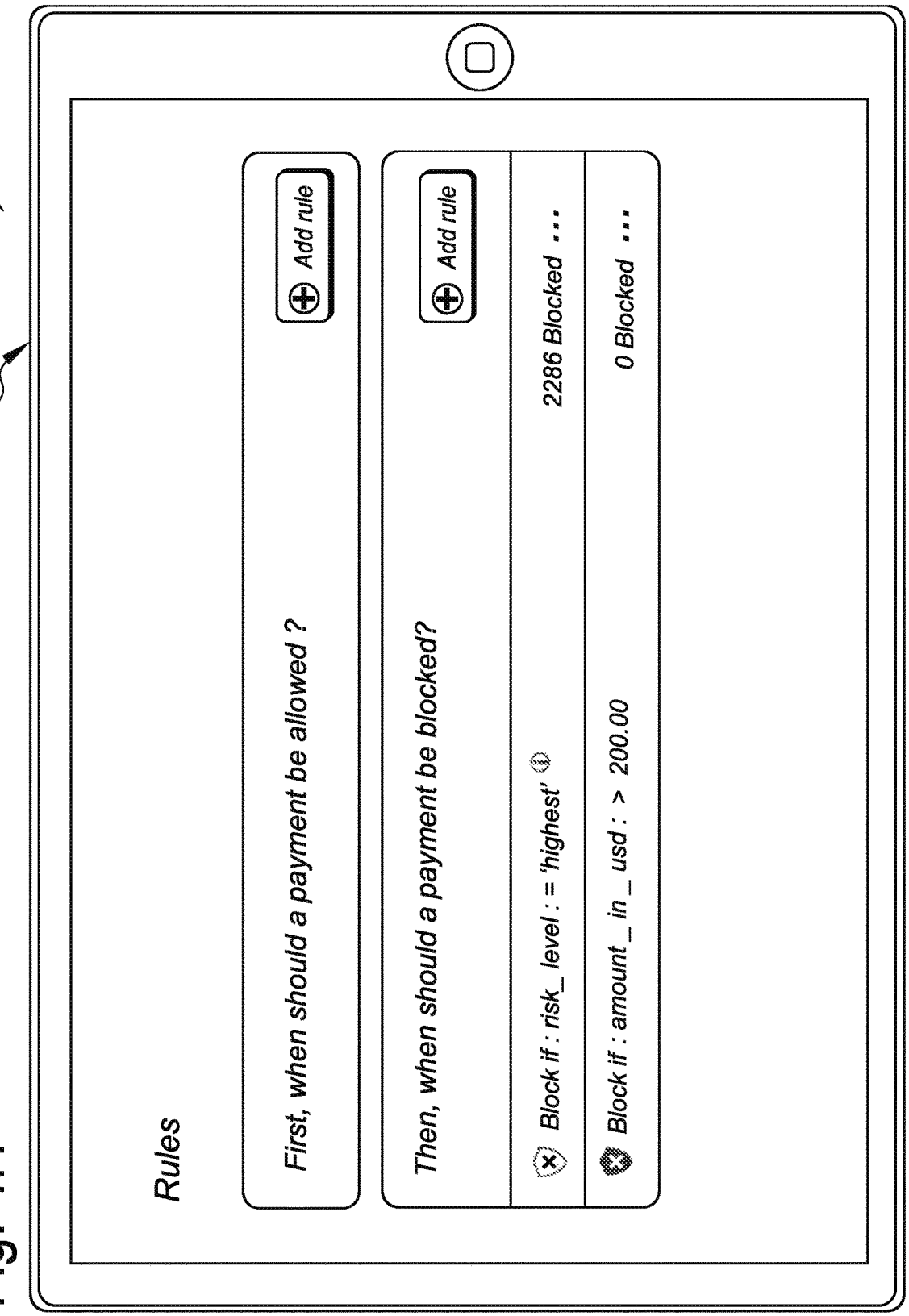
FIG. 4H depicts an exemplary rule submission GUI via which a user may add customized rules in accordance with described embodiments.

FIG. 4H depicts an exemplary rule submission GUI 411 via which a user may add customized user rules. However, there is now depicted the additional rule to block if the amount in U.S. dollars is greater than $200.00. Because the rule was just added, there are presently 0 blocked transactions.

FIG. 4I depicts an exemplary manual rule review GUI 412 via which a user may manually review held or quarantined transactions. For instance, transactions which are flagged by the system for manual review or transactions that are triggered to be held for manual review based on a user's rule may be reviewed via the manual review GUI 412 and either marked as safe or blocked. In such a configuration, the transaction will be blocked as a default action unless then user manually reviews and marks the transaction as being safe. At the bottom panel of the GUI 412 there is an indication of the assessment of risk by the system, showing for this particular transaction that the risk level was evaluated to be a high risk transaction. It is feasible that low risk transactions are held for manual review where they match a user rule specifying to hold the transaction for manual review rather than specifying an action to block. In such a case, the rule would be help for manual review pursuant to the user's rule, but the risk assessment by the system might be low, elevated, or high, or may alternatively depict a numerical value on a scale, such as a percentage or a value out of 100, etc.

Figure 5:
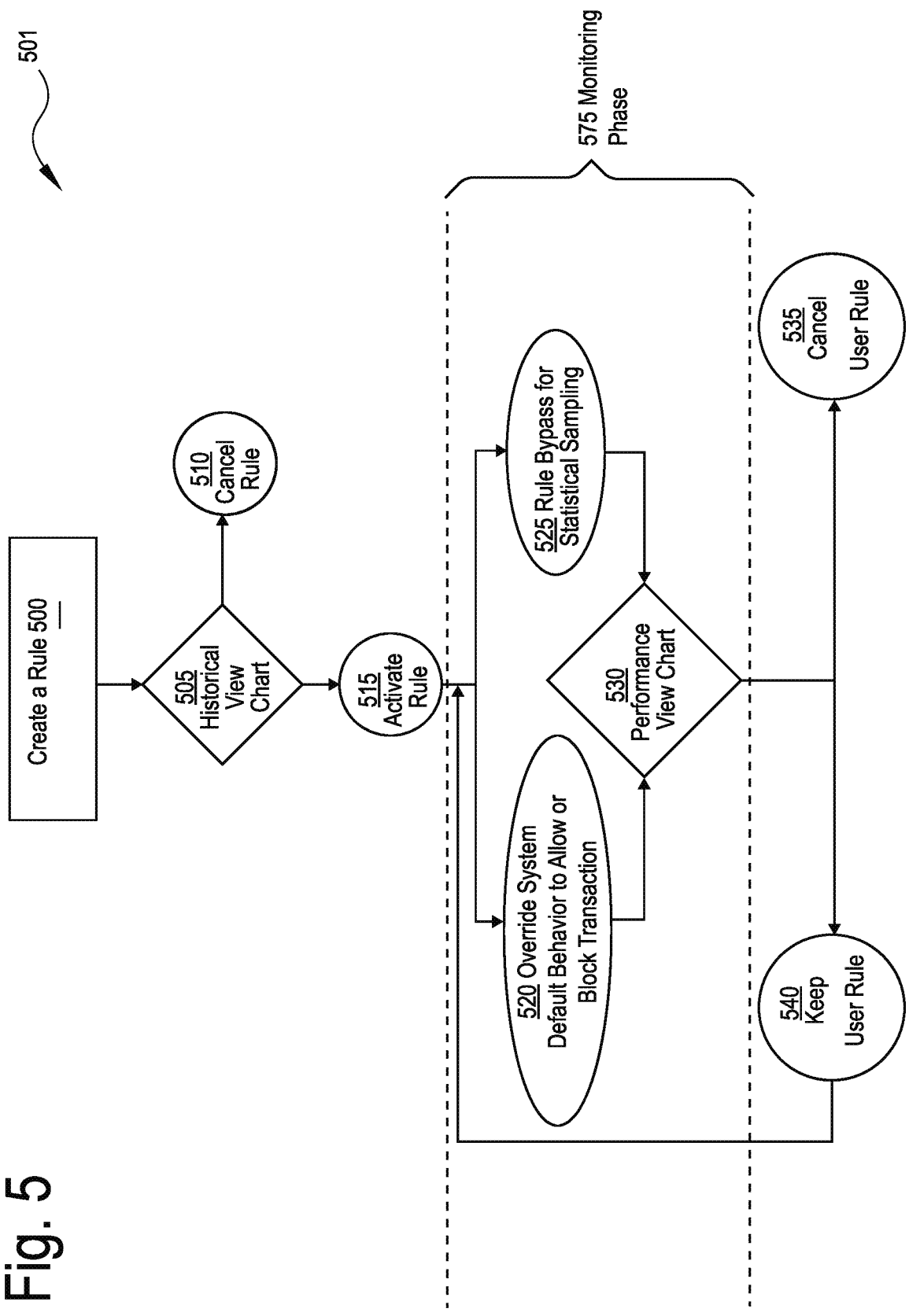
FIG. 5 depicts a process flow for creating a new rule in accordance with described embodiments.

FIG. 5 depicts a process flow 501 for creating a new user rule 500. Beginning at block 500, processing logic permits a user to create a new user rule after which processing proceeds to decision point 505 where the user reviews the historical "what if" performance of the proposed but not yet activated user rule via the historical view chart. From decision point 505, the user may simply cancel 510 the proposed user rule without activating the rule in the system, causing processing to end.

Alternatively, the user may activate the rule 515 from which processing will then cause the system to proceed to element 520 where the activated rule overrides the system behavior to allow or block a matching transaction based on the activated rule. As depicted, certain transactions will be subjected to operation 525 where a rule bypass for statistical sampling occurs, thus causing a transaction matching a rule and blocked pursuant to the merchant rule to nevertheless be processed in violation of the user rule for the purposes of monitoring and collecting statistical information. Processing then proceeds to the performance view chart 530 where a user may review actual performance of a rule in effect and finally processing either ends if the user elects to cancel the user rule at operation 535 or processing will loop if the merchant elects to keep the user rule at operation 540 causing processing to then return to the monitoring phase 575 where the activated rules causes an override of the systems default behavior or permits rule bypass for statistical sampling.

According to a particular embodiment, the system implements an evaluation feature for the user's activated rule and provides ongoing monitoring for the rule. Although it is possible for the user to review historical statistics for the proposed rule, once that rule is in effect and active there are two problems with monitoring. First, fraud patterns change over time and consequently the accuracy and effectiveness of the user's rule may increase or decrease with time as such patterns change. Secondly, if 100% of the transactions matching the rule are blocked at the system then it cannot be known for future transactions whether or not such transactions, had they been processed, would have ultimately resulted in a fraudulent charge, a non-fraudulent charge, or a processed charge subsequently declined by the issuer. Therefore, the system performs ongoing monitoring of the rule including permitting rule bypass for statistical sampling 525 such that the accuracy and effectiveness of a rule may be observed and assessed for a future period of time after the rule is activated.

Consider for example a rule blocking all charges from Russia. While such a rule may be instituted, the recommendation engine of the system should advise the user whether the rule is actually helping to prevent fraudulent transactions or if the rule is in actuality deteriorating and blocking good transactions over time, thus harming the profitability of the user's business. Problematically, if all transactions are blocked when they originate from Russia then it cannot be known if future transactions from Russia were good transactions whereas if transactions from Russia are not blocked then the user may be subjected to excessive fraud risk.

An optional feature is therefore provided for the user's creating such rules. Such users may opt-in to participating in the ongoing evaluation feature for their active rules by selecting a check box at the rule creation GUI or by other agreement or acknowledgement means. If the user does not wish to participate, then all transactions matching their specified criteria are rejected or accepted without further processing. Conversely, for users participating in the evaluation feature, the system performs rule bypass for statistical sampling 525 in proportion to the evaluated fraud likelihood score generated for such transactions. For instance, if the user's rule specifies to reject all transactions originating from Russia, then a small fraction of these charges matching the user's rule will actually be permitted to go through and be processed by the system, bypassing the user's rule for the purposes of statistical sampling.

According to one embodiment, if the charge is sampled for statistical purposes and permitted to go through in violation of the user's rule, then the operator of the system (e.g., Stripe) will cover the cost of any chargeback associated with the transaction if a charge back results. However, if the transaction is processed in violation of the user rule and ultimately is determined to be a good (e.g., not fraudulent) transaction, then user benefits from the statistical sampling rule bypass. Nevertheless, by sampling a small fraction of the charges in violation of the user rule, such as letting through 2% of such charges despite the rule, then it is possible for the system to evaluate such transactions to determine if they are actually fraudulent, or what portion of them are fraudulent, or if none of them result in fraudulent charges. With such ongoing monitoring, the system is then enabled to surface recommendations to the user to advise the user as to the accuracy and effectiveness of the active rule, and thus permit the user to make changes to the rule, keep the rule active, or to cancel the rule. For instance, the system may surface a recommendation to the user advising that of the 2% of transactions which bypassed the rule for statistical sampling purposes, a large percentage, such as 80% of such transactions, actually charged back as being fraudulent. In such a case, the user is likely to keep such a rule active. However, it may be that of such transactions sampled, none of the transactions, or a very low percentage of transactions were fraudulent, and therefore, perhaps the user's rule is no longer effective.

According to a particular embodiment, selection of what quantity of transactions to process via the rule bypass for statistical sampling is variable according to the evaluated risk of the transaction in question as well as other metrics, such as merchant volume, etc. For instance, a small merchant having relatively low volume requires a greater proportion of charges to be sampled in violation of the rule for the resulting sample set to be statistically meaningful. Conversely, a large merchant with tens of thousands of transactions may require a significantly smaller proportion of transactions to be sampled in violation of the rule and still yield statistically meaningful results. By letting a fraction of the transactions through for processing despite the prohibition of the rule it is possible to statistically assess the accuracy and effectiveness of the user's custom rule thus providing the merchant with not just a customizable transaction authorization and rejection utility but additionally provide the user with relevant and meaningful feedback and recommendations on an ongoing basis. Such feedback may be critical to, for instance, reverse a rule that was once effective but no longer is appropriate and thus costs the business more in lost sales than it saves in fraud elimination.

Figure 6:
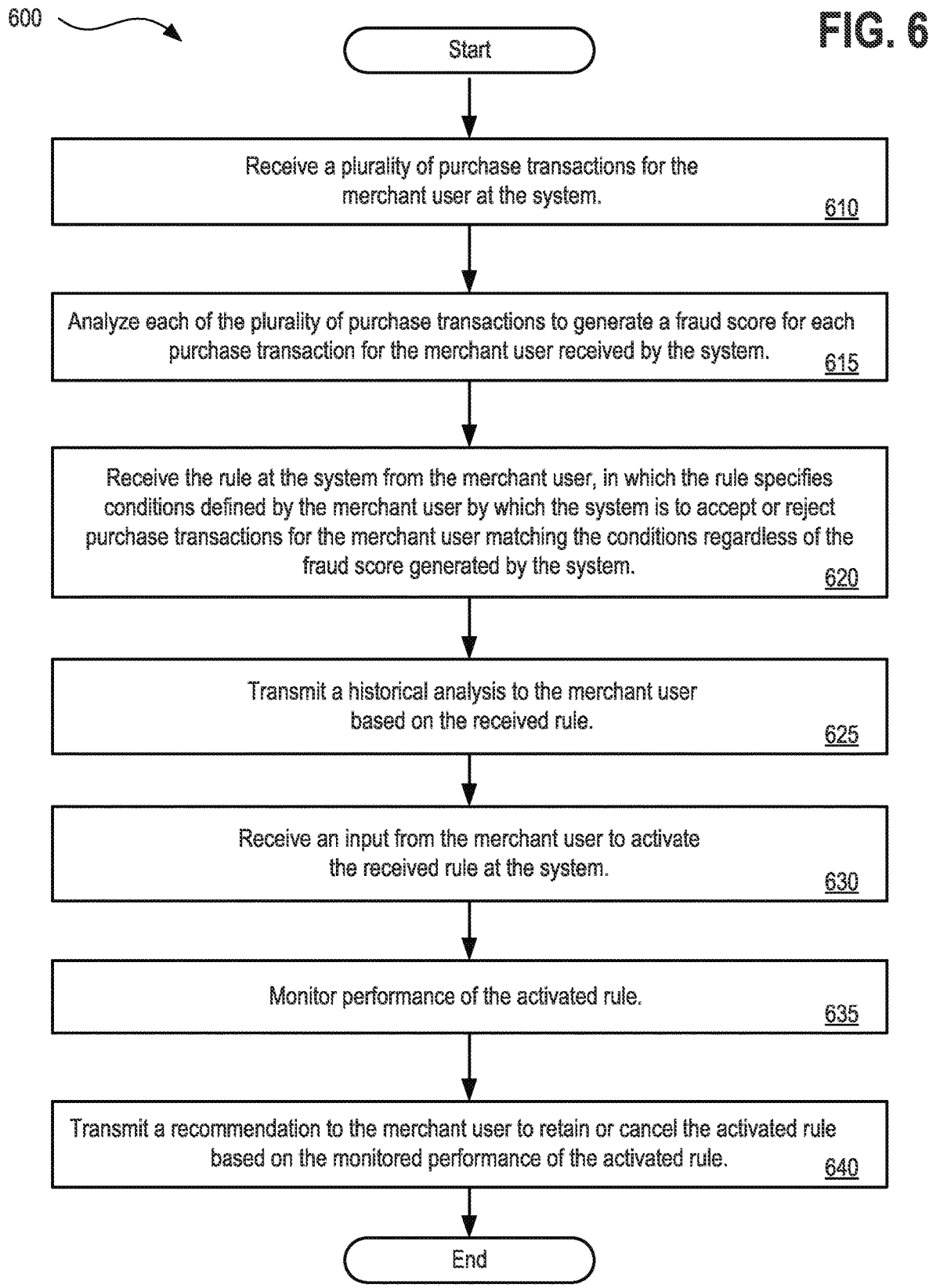
FIG. 6 depicts a flow diagram illustrating a method for implementing user customizable risk management tools with statistical modeling and a recommendation engine in accordance with disclosed embodiments.

FIG. 6 depicts a flow diagram illustrating method 600 for implementing user customizable risk management tools with statistical modeling and a recommendation engine in accordance with disclosed embodiments. Method 600 may be performed by processing logic that may include hardware (e.g., circuitry, dedicated logic, programmable logic, microcode, etc.), software (e.g., instructions run on a processing device) to perform various operations such as evaluating, receiving, analyzing, transmitting, monitoring, generating, associating, sending, splitting, inviting, updating, presenting, interfacing, communicating, querying, processing, etc., in pursuance of the systems and methods as described herein. For example, the system 210 as depicted at FIG. 2A or the system 700 at FIG. 7 or the machine 800 at FIG. 8, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference method 600 depicted at FIG. 6, at block 610, processing logic receives a plurality of purchase transactions for the user at the system. At block 615, processing logic analyzes each of the plurality of purchase transactions to generate a fraud likelihood score for each purchase transaction for the user received by the system. At block 620, processing logic receives the rule at the system from the user, in which the rule specifies conditions defined by the user by which the system is to accept or reject purchase transactions for the user matching the conditions regardless of the fraud likelihood score generated by the system. At block 625, processing logic transmits a historical analysis to the user based on the received rule. At block 630, processing logic receives an input from the user to activate the received rule at the system. At block 635, processing logic monitors performance of the activated rule. At block 640, the method 600 concludes with processing logic which transmits a recommendation to the user to retain or cancel the activated rule based on the monitored performance of the activated rule.

A distinction may be made between rules that are proposed or submitted to the system but not yet activated with the system versus those rules having actually been made active and now being enforced and monitored by the system. Therefore, according to another embodiment of method 600, receiving the rule at the system from the user includes receiving the rule from the user in an inactive state. According to another embodiment, method 600 further includes maintaining the rule in the inactive state until receiving affirmative confirmation from the user to activate the rule.

In accordance with particular embodiments, the system permits the user to "test" or view the historical impact of the rule upon past transactions for a specified period. However, in other embodiments the user having submitted a rule for activation must first view historical analysis before being permitted to advance and actually activate the newly proposed rule. Therefore, according to another embodiment of method 600, the user rule is received in an inactive state and the system simulates purchase transaction data affected during a specified historical period by applying the user rule to the simulated transaction data without activating the user rule within the system. According to such an embodiment, transmitting the historical analysis to the user includes transmitting a Graphical User Interface (GUI) to the user including at least a historical view chart displaying the simulated purchase transaction data.

According to another embodiment of method 600, the GUI having the historical view chart displayed therein defaults to the specified historical period according to a configuration of the system and further in which the specified historical period is modifiable at the GUI by the user, in which modifications of the specified historical period at the GUI by the user are transmitted to the system with a request for updated simulated purchase transaction data based on the specified historical period as modified at the GUI.

According to another embodiment of method 600, transmitting the historical analysis to the user based on the received rule from the user includes transmitting a Graphical User Interface (GUI) to the user to display the historical analysis at a user display device. According to such an embodiment, the GUI includes an option to activate the rule received from the user within the system or to cancel the rule received from the user within the system without the received rule ever being activated or applied to any transaction for the user.

According to another embodiment of method 600, receiving the input from the user to activate the received rule at the system includes receiving the input via the GUI which displays the historical analysis at the user display device; and in which the user cannot activate the rule within the system prior to navigating to the GUI which displays the historical analysis and activating the rule at the GUI which displays the historical analysis. For instance, activation of a rule may be received by the system from the GUI displayed to the user after the user views and navigates through the historical view GUI as a mandatory operation to the user seeking to activate the proposed rule.

According to another embodiment of method 600, the rule is maintained in an active state during the monitoring of the performance of the activated rule. According to such an embodiment, the system collects purchase transaction data affected by the activated rule during a specified monitoring period during which the rule is applied to at least a portion of the plurality of purchase transactions at the system pursuant to the conditions defined by the user via the rule. Still further, according to such an embodiment, transmitting the recommendation to the user to retain or cancel the activated rule based on the monitored performance of the activated rule includes transmitting a Graphical User Interface (GUI) to the user including at least a performance view chart displaying the collected purchase transaction data affected by the activated rule.

According to another embodiment of method 600, transmitting the recommendation to the user to retain or cancel the activated rule based on the monitored performance of the activated rule includes transmitting a Graphical User Interface (GUI) to the user to display monitored performance data at a user display device: in which the GUI includes an option to retain the active rule within the system or to cancel the active rule within the system.

According to another embodiment, method 600 further includes: receiving new input from the user retain or cancel the active rule via the GUI which displays the monitored performance data at the user display device; and in which the user cannot retain the rule within the system without navigating to the GUI which displays the monitored performance data and affirmatively indicating via the new input to retain the active rule at the GUI which displays the monitored performance data.

According to another embodiment of method 600, analyzing each of the plurality of purchase transactions to generate a fraud likelihood score for each purchase transaction received by the system includes marking any purchase transaction having a fraud likelihood score in excess of a specified fraud threshold as fraudulent; and in which transmitting the recommendation to the user includes: (i) indicating a portion of the purchase transactions having been marked by the system as fraudulent which also match the active rule and are rejected by the system as fraudulent before application of the active rule; and (ii) indicating a second portion of the purchase transactions below the specified fraud threshold and not marked as fraudulent by the system which are rejected by the system due to matching the active rule.

According to another embodiment, method 600 further includes pushing a notification to the user when the second portion of the purchase transactions which are rejected by the system due to matching the active rule falls below a rule effectiveness threshold.

According to another embodiment of method 600, transmitting the recommendation to the user further includes: indicating a percentage of all purchase transactions associated with the user matching the active rule regardless of the fraud likelihood score for any of the purchase transactions.

According to another embodiment, method 600 further includes: for each of the plurality of purchase transactions received by the system, determining a final transaction state as being either fraudulent or non-fraudulent; and in which transmitting the recommendation to the user further includes indicating what percentage of the plurality of purchase transactions associated with the user determined to have a final transaction state of fraudulent match the active rule. For instance, the GUI may present a computed recall rate indicating for all the transactions that are actually fraudulent, what percentage of those transactions matches the user's rule.

According to another embodiment, method 600 further includes: for each of the plurality of purchase transactions received by the system, determining a final transaction state as being either fraudulent or non-fraudulent; and in which transmitting the recommendation to the user further includes indicating what percentage of the plurality of purchase transactions associated with the user matching the active rule are determined to have a final transaction state of fraudulent. For instance, the GUI may present a computed precision rate to the user indicating for all the transactions that match the user's rule, what percentage of those transactions were actually fraudulent.

According to another embodiment of method 600, performing statistical sampling and statistical analysis of the plurality of purchase transactions matching the active rule; in which the statistical sampling includes permitting at least a portion of the purchase transactions matching the active rule to be processed without rejection in violation of the active rule; and in which performing the statistical analysis includes determining whether purchase transactions processed without rejection in violation of the active rule are subsequently determined to have a final transaction state as either fraudulent or non-fraudulent.

According to another embodiment of method 600, transmitting the recommendation to the user further includes indicating effectivity data for the rule based on the statistical sampling and statistical analysis performed on the purchase transactions matching the active rule.

According to another embodiment of method 600, transactions matching the active rule and processed without rejection by the system in violation of the active rule pursuant to sampling criteria result in a financial loss when a final transaction state for the transactions is determined to be fraudulent; and in which an amount corresponding to the financial loss is credited to the user by the system as compensation for the financial loss.

According to another embodiment of method 600, analyzing each of the plurality of purchase transactions to generate a fraud likelihood score for each purchase transaction received by the system further includes scoring each of the plurality of transactions as a high risk transaction, having a fraud likelihood score in excess of a high risk fraud threshold, or as a low risk transaction, having a fraud likelihood score below a low risk fraud threshold, or as an elevated risk transaction, having a fraud likelihood score between the high risk fraud threshold and the low risk fraud threshold.

According to another embodiment, method 600 further includes: performing statistical sampling and statistical analysis of the plurality of purchase transactions matching the active rule; in which the statistical sampling includes: (i) sampling a first portion of the purchase transactions matching the active rule and having been fraud likelihood scored as a low risk transaction at a first sampling rate; (ii) sampling a second portion of the purchase transactions matching the active rule and having been fraud likelihood scored as an elevated risk transaction at a second sampling rate; (iii) sampling a third portion of the purchase transactions matching the active rule and having been fraud likelihood scored as a high risk transaction at a third sampling rate; and in which the first sampling rate for the low risk transactions is a highest sampling rate greater than the second and third sampling rates, in which the third sampling rate for the high risk transactions is a lowest sampling rate, lower than the first and second sampling rates, and in which the second sampling rate for the elevated risk transactions is between the first and third sampling rates.

According to another embodiment of method 600, the statistical analysis includes weighting the first, second, and third portions of the purchase transactions sampled differently based on the first, second, and third sampling rates; in which the first portion of the purchase transactions having the highest sampling rate are given a lowest weight; in which the third portion of the purchase transactions having the lowest sampling rate are given a greatest weight; and in which the second portion of the purchase transactions having the second sampling rate between the first and third sampling rates corresponding to the highest and lowest sampling rates is given a weight between that of the first and third portions of the sampled purchase transactions.

According to another embodiment of method 600, the system includes a cloud based system communicably interfaced to a user device having at least a processor and a memory therein via a public Internet and further communicably interfaced to purchaser user devices, each having at least a processor and a memory therein via the public Internet; and in which the plurality of purchase transactions are received at the system from the purchaser user devices.

According to a particular embodiment there is a non-transitory computer readable storage media having instructions stored thereupon for evaluating performance of a rule defined by a user for fraud prevention in which the instructions, when executed by a system having at least a processor and a memory therein, the instructions cause the system to perform operations including: receiving a plurality of purchase transactions for the user at the system; analyzing each of the plurality of purchase transactions to generate a fraud likelihood score for each purchase transaction for the user received by the system; receiving the rule at the system from the user, in which the rule specifies conditions defined by the user by which the system is to accept or reject purchase transactions for the user matching the conditions regardless of the fraud likelihood score generated by the system; transmitting a historical analysis to the user based on the received rule; receiving an input from the user to activate the received rule at the system; monitoring performance of the activated rule; and transmitting a recommendation to the user to retain or cancel the activated rule based on the monitored performance of the activated rule.

Figure 7:
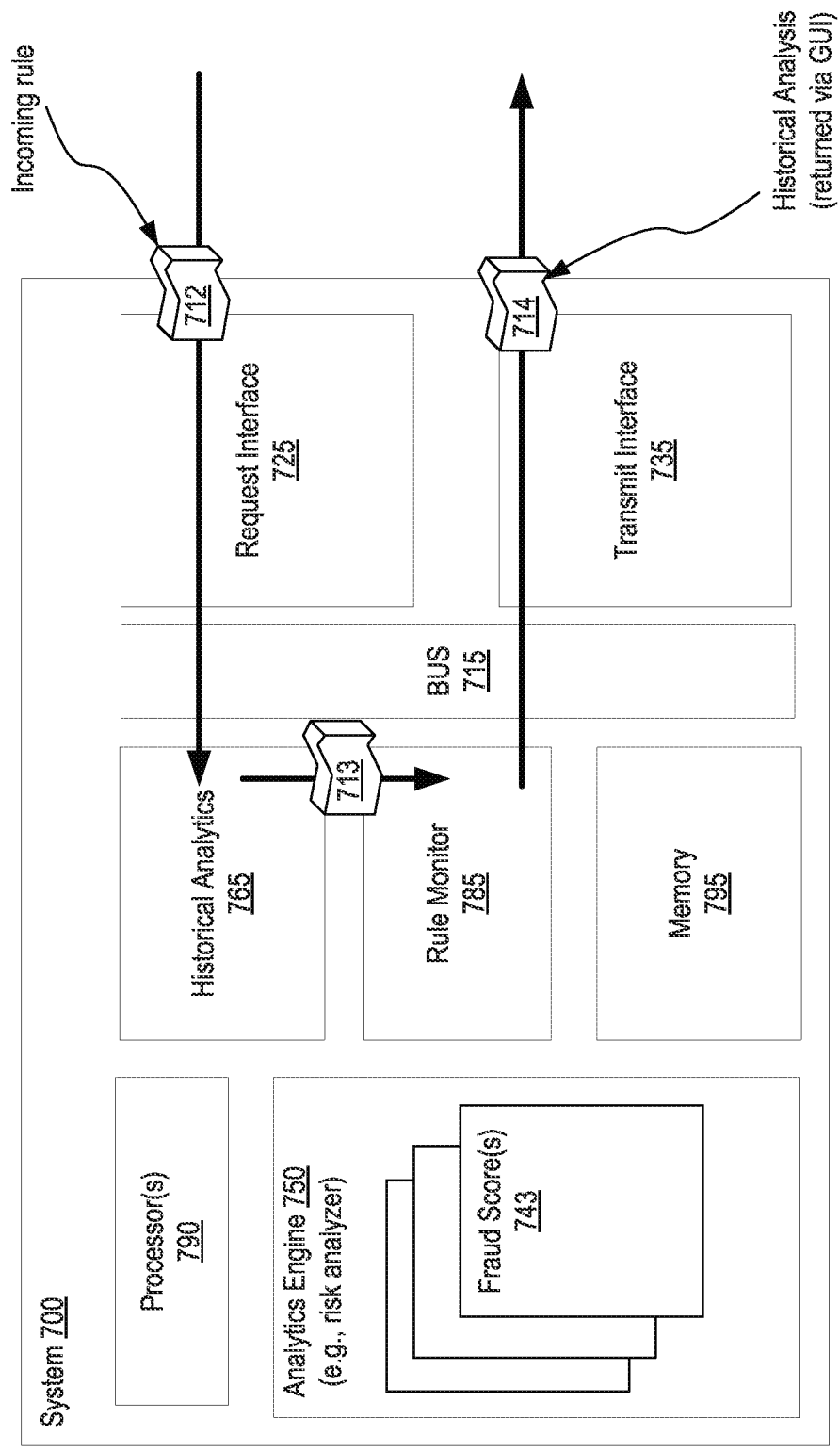
FIG. 7 shows a diagrammatic representation of a system within which embodiments may operate, be installed, integrated, or configured in accordance with described embodiments.

FIG. 7 shows a diagrammatic representation of a system 700 within which embodiments may operate, be installed, integrated, or configured. In accordance with one embodiment, there is a system 700 having at least a processor 790 and a memory 795 therein to execute application code 785. Such a system 700 may communicatively interface with and cooperatively execute with the benefit of a hosted computing environment, such as a cloud computing environment as depicted at FIG. 1, as an on-demand service provider, a cloud-based service provider, within a client-server environment, etc.

According to the depicted embodiment, the system 700 includes the processor 790 and the memory 795 to execute instructions at the system 700; an analytics engine 750 provides analytics to generate fraud likelihood score(s) 743 for transactions handled by the system indicative of a level of risk. A request interface 725 is enabled to receive incoming requests, for instance, from users and user devices interacting with the system to submit rule requests, utilize the system's dashboard, etc. The request may be via web interfaces, API calls, etc. A historical analytics 765 module 713 generates simulated data presenting a "what if" scenario for rules that are proposed or tested against the system but not yet active. The Rule monitor 785 provides rule monitoring for rules submitted and activated by the system. According to certain embodiments, rule monitor may additionally perform statistical sampling and analysis in support of the methodologies described herein.

A transmit interface 735 is enabled to return charts, graphs, alerts, confirmation, status, and other information to users interacting with the system.

Bus 715 interfaces the various components of the system 700 amongst each other, with any other peripheral(s) of the system 700, and with external components such as external network elements, other machines, client devices, cloud computing services, etc. Communications may further include communicating with external devices via a network interface over a LAN, WAN, or the public Internet.

It is therefore in accordance with a particular embodiment that there is a system 700 to evaluate performance of a rule defined by a user for fraud prevention, such a system 700 having therein: a memory 795 to store instructions; a processor 790 to execute the stored instructions; a receive interface 725 to receive at the system a plurality of purchase transactions for the user; a risk evaluator 750 to analyze each of the plurality of purchase transactions to generate a fraud likelihood score for each purchase transaction for the user received by the system; the receive interface 725 to further receive the rule 712 at the system from the user, in which the rule specifies conditions 713 defined by the user by which the system is to accept or reject purchase transactions for the user matching the conditions regardless of the fraud likelihood score 743 generated by the system 700; a transmit interface 735 to transmit a historical analysis 714 to the user based on the received rule 712; the receive interface 725 to further receive an input from the user to activate the received rule at the system 700; a rule monitor 785 to monitor performance of the activated rule; and the transmit interface 735 to further transmit a recommendation to the user to retain or cancel the activated rule based on the monitored performance of the activated rule.

Figure 8:
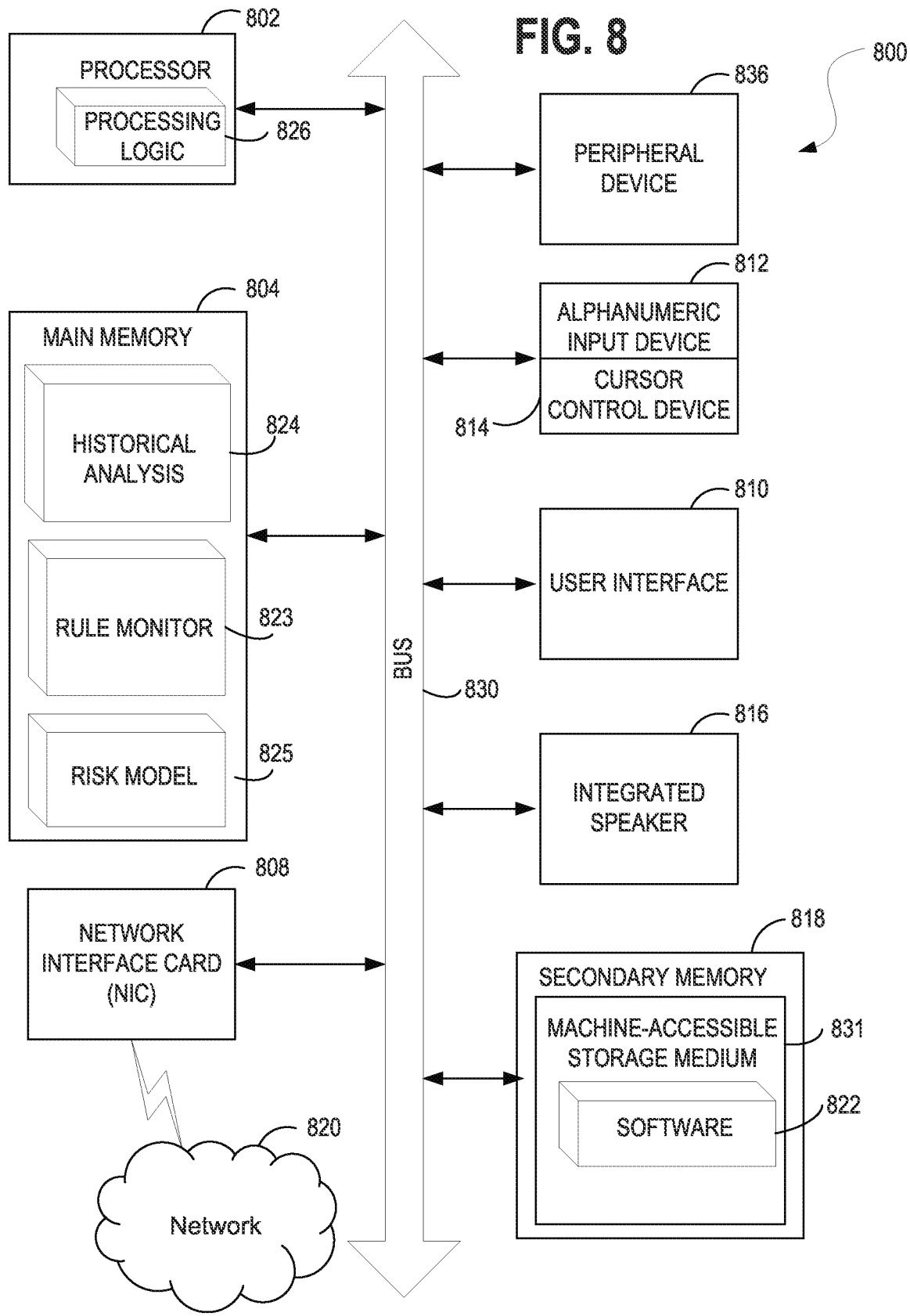
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database system implementation), which communicate with each other via a bus 830. Main memory 804 includes a historical analysis 824 module to generate a simulated historical analysis GUI by which a user may test or evaluate a proposed rule. Main memory 804 additionally includes a rule monitor 823 to monitor submitted and activated rules on an on-going basis including performing statistical sampling and analysis on an ongoing basis. Main memory 804 further includes the risk model 825, such as a random forest of trees (e.g., in compressed form) by which a risk analyzer may evaluate and generate fraud likelihood scores for transactions and from which explanations may be derived and provided to users which inquire or dispute a particular transaction. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
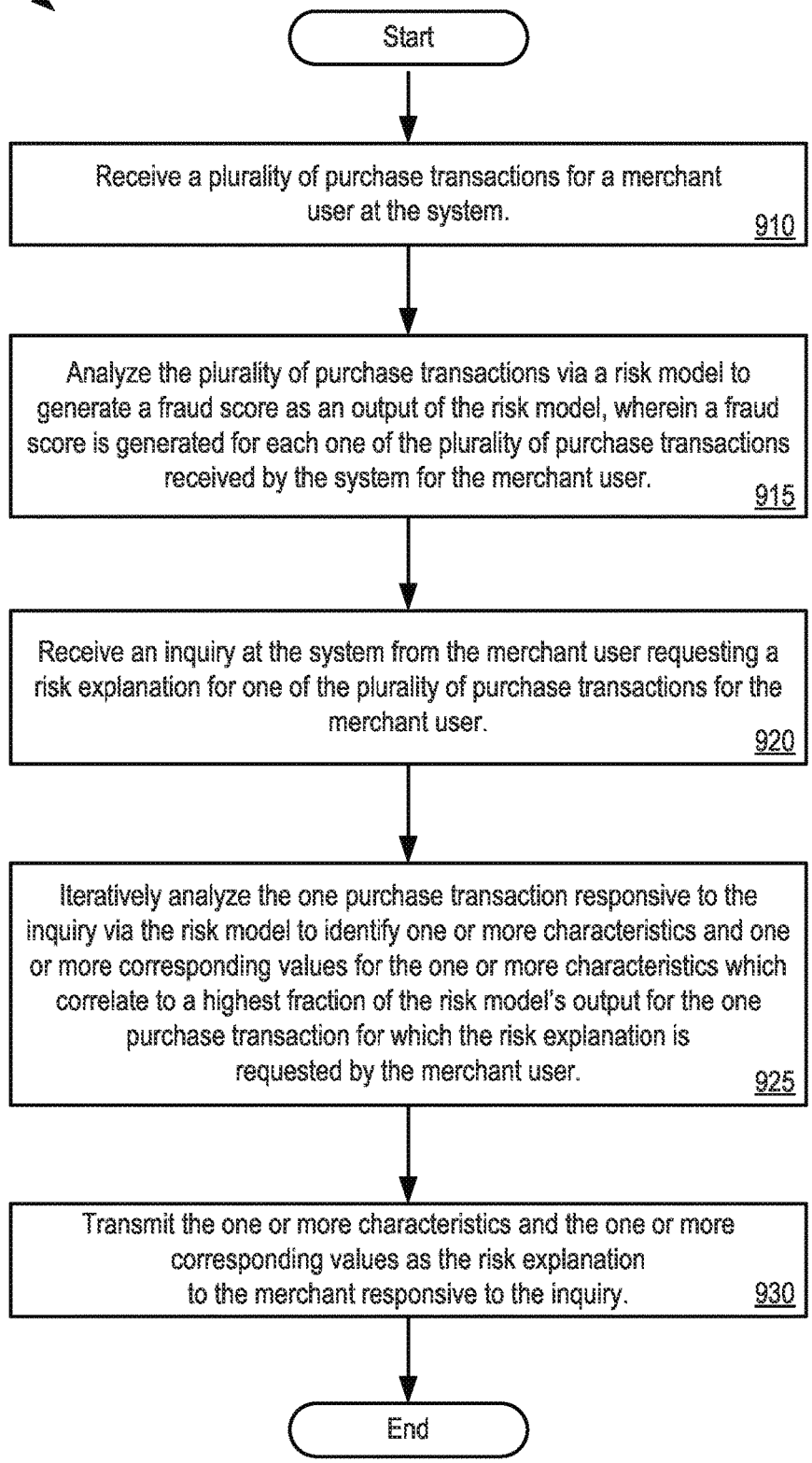
FIG. 9 depicts a flow diagram illustrating method for generating explanations why attempted transactions are deemed to have a heightened expectation of being fraudulent.

FIG. 9 depicts a flow diagram illustrating method 900 for generating risk explanations from a risk model for purchase transactions in accordance with disclosed embodiments. Method 900 may be performed by processing logic that may include hardware (e.g., circuitry, dedicated logic, programmable logic, microcode, etc.), software (e.g., instructions run on a processing device) to perform various operations such as evaluating, receiving, analyzing, iteratively analyzing, transmitting, monitoring, generating, associating, sending, splitting, inviting, updating, presenting, interfacing, communicating, querying, processing, etc., in pursuance of the systems and methods as described herein. For example, the system 210 as depicted at FIG. 2A or the system 1000 at FIG. 10 or the machine 800 at FIG. 8, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference method 900 depicted at FIG. 9, at block 910, processing logic receives a plurality of purchase transactions for a user at the system. At block 915, processing logic analyzes the plurality of purchase transactions via a risk model to generate a fraud likelihood score as an output of the risk model, wherein a fraud likelihood score is generated for each one of the plurality of purchase transactions received by the system for the user. At block 920, processing logic receives an inquiry at the system from the user requesting a risk explanation for one of the plurality of purchase transactions for the user. At block 925, processing logic iteratively analyzes the one purchase transaction responsive to the inquiry via the risk model to identify one or more characteristics and one or more corresponding values for the one or more characteristics which correlate to a highest fraction of the risk model's output for the one purchase transaction for which the risk explanation is requested by the user. At block 930, processing logic transmits the one or more characteristics and the one or more corresponding values as the risk explanation to the merchant responsive to the inquiry.

According to another embodiment of method 900, iteratively analyzing the one purchase transaction responsive to the inquiry via the risk model to identify one or more characteristics and one or more corresponding values includes generating one or more predicates in a "name=value" pair format of predicate attribute names and predicate attribute values from the risk model; and in which transmitting the one or more characteristics and the one or more corresponding values as the risk explanation to the merchant responsive to the inquiry includes transmitting the identified one or more predicate attribute names and predicate attribute values to the user as the risk explanation responsive to the inquiry.

According to another embodiment of method 900, iteratively analyzing the one purchase transaction responsive to the inquiry via the risk model to identify one or more characteristics and one or more corresponding values includes identifying a plurality of predicates that, when input into the risk model, generate a simulated fraud likelihood score within a configurable threshold variance of the fraud likelihood score output by the risk model for the one purchase transaction for which the risk explanation is requested by the user.

According to another embodiment of method 900, transmitting the risk explanation to the merchant responsive to the inquiry includes transmitting a risk explanation GUI to the user for display via a user dashboard.

According to another embodiment of method 900, transmitting the risk explanation to the merchant responsive to the inquiry includes transmitting a single primary risk factor to the user as the risk explanation responsive to the inquiry; in which the single primary risk factor corresponds to a predicate derived from the risk model that when input into the risk model results in a simulated fraud likelihood score having a highest correlation to the fraud likelihood score output by the risk model for the one purchase transaction for which the risk explanation is requested by the user.

According to another embodiment of method 900, transmitting the risk explanation to the merchant responsive to the inquiry includes transmitting two or more primary risk factors to the user as the risk explanation responsive to the inquiry; in which the two or more primary risk factors correspond to predicates derived from the risk model that when input into the risk model result in a simulated fraud likelihood score within a configurable threshold variance of the fraud likelihood score output by the risk model for the one purchase transaction for which the risk explanation is requested by the user.

According to another embodiment of method 900, the risk model includes a random forest structured model generated through machine learning from training data.

According to another embodiment of method 900, iteratively analyzing the one purchase transaction responsive to the inquiry via the risk model to identify one or more characteristics and one or more corresponding values for the one or more characteristics includes: obtaining a complete set of predicates from the risk model evaluated to true for any positive case in the training data; computing precision and recall for each predicate within the complete set of predicates; selecting a configurable quantity of predicates based on the computed precision or recall or both precision and recall for each of the complete set of predicates; and selecting a set of two or more predicates that when input into the risk model results in a simulated fraud likelihood score having a highest correlation to the fraud likelihood score output by the risk model for the one purchase transaction for which the risk explanation is requested by the user.

According to another embodiment of method 900, receiving the inquiry at the system from the user requesting the risk explanation for one of the plurality of purchase transactions for the user includes: receiving the request for the risk explanation as part of a dispute of the one purchase transaction.

According to another embodiment of method 900, receiving the inquiry at the system from the user includes receiving a request for the risk explanation for one of the plurality of purchase transactions rejected by the system due to the purchase transaction having a fraud likelihood score generated via the risk model which exceeds a risk threshold configurable at the system.

According to another embodiment of method 900, receiving the inquiry at the system from the user includes receiving a request for the risk explanation for one of the plurality of purchase transactions processed by the system due to the purchase transaction having a fraud likelihood score generated via the risk model below a risk threshold configurable at the system and subsequently declined by a third party credit card issuer.

According to another embodiment of method 900, receiving the inquiry at the system from the user includes receiving a request for the risk explanation for one of the plurality of purchase transactions processed by the system due to the purchase transaction having a fraud likelihood score generated via the risk model below a risk threshold configurable at the system and subsequently authorized by a third party credit card issuer and subsequently disputed by a purchaser as a fraudulent or erroneous purchase transaction.

According to another embodiment of method 900, receiving the inquiry at the system from the user includes receiving a request for the risk explanation for one of the plurality of purchase transactions rejected by the system due to the purchase transaction matching an active user rule; in which the rejected purchase transaction has a fraud likelihood score generated via the risk model below a risk threshold configurable at the system; and in which the default behavior to process the purchase transaction is overridden by the active user rule.

According to another embodiment of method 900, receiving the inquiry at the system from the user includes receiving a request for the risk explanation for one of the plurality of purchase transactions processed by the system due to the purchase transaction matching an active user rule; in which the processed purchase transaction has a fraud likelihood score generated via the risk model which exceeds a risk threshold configurable at the system; and in which the default behavior to reject the purchase transaction is overridden by the active user rule specifying the matching purchase transaction is to be processed.

According to another embodiment of method 900, receiving the inquiry at the system from the user includes receiving a request for the risk explanation for one of the plurality of purchase transactions processed by the system; in which the processed purchase transaction matches a user rule specifying the transaction is to be rejected; and in which the default behavior to reject the purchase transaction pursuant to the purchase transaction matching the user rule is overridden by the system to collect statistical sampling data for the user rule due to the purchase transaction being selected for statistical sampling pursuant to a sampling rate configurable at the system.

In accordance with a particular embodiment there is a non-transitory computer readable storage media having instructions stored thereupon for generating a risk explanation for purchase transactions in which the instructions, when executed by a system having at least a processor and a memory therein, the instructions cause the system to perform operations including: receiving a plurality of purchase transactions for a user at the system; analyzing the plurality of purchase transactions via a risk model to generate a fraud likelihood score as an output of the risk model, in which a fraud likelihood score is generated for each one of the plurality of purchase transactions received by the system for the user; receiving an inquiry at the system from the user requesting a risk explanation for one of the plurality of purchase transactions for the user; iteratively analyzing the one purchase transaction responsive to the inquiry via the risk model to identify one or more characteristics and one or more corresponding values for the one or more characteristics which correlate to a highest fraction of the risk model's output for the one purchase transaction for which the risk explanation is requested by the user; and transmitting the one or more characteristics and the one or more corresponding values as the risk explanation to the merchant responsive to the inquiry.

Figure 10:
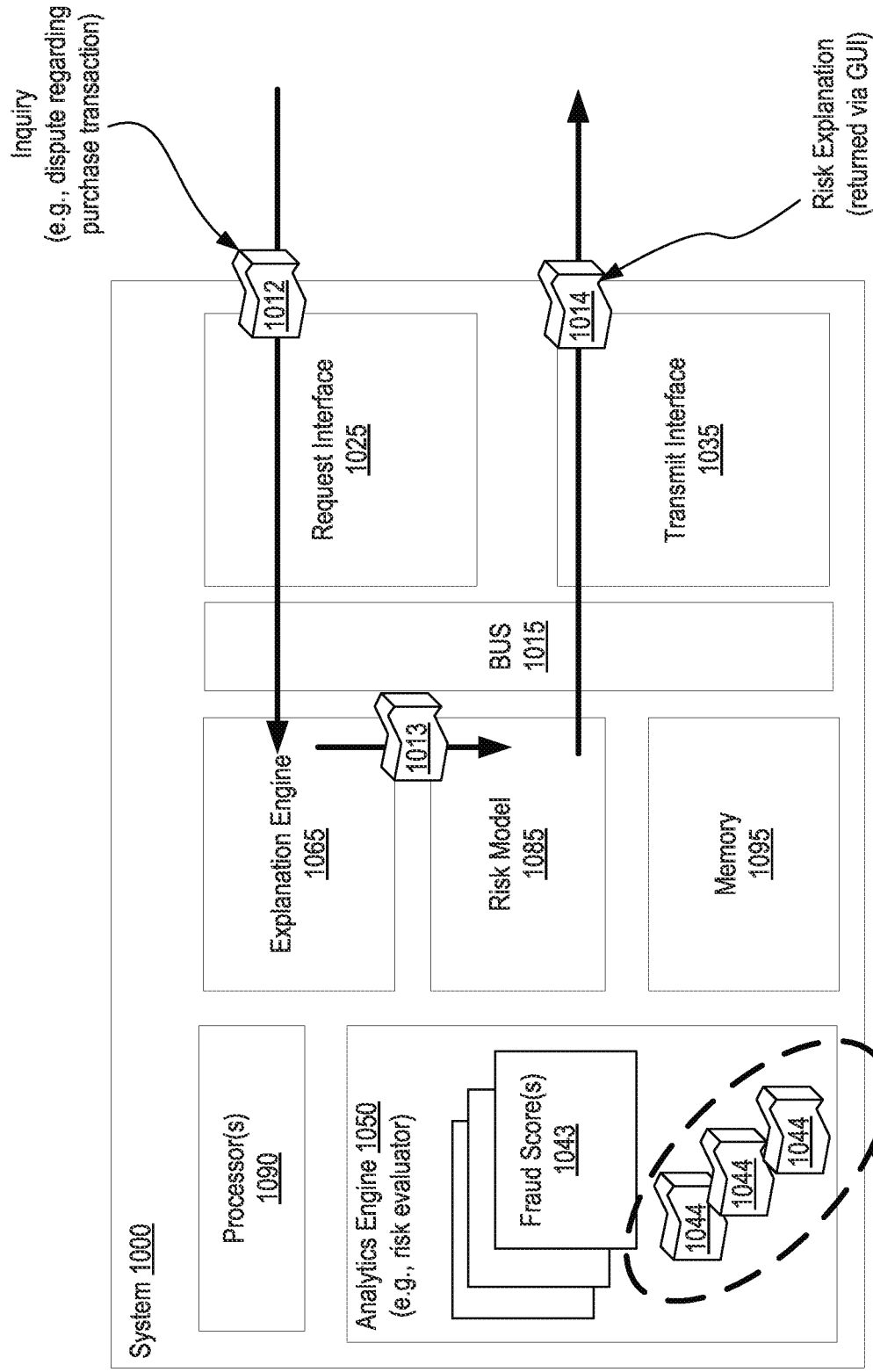
FIG. 10 shows another diagrammatic representation of a system within which embodiments may operate, be installed, integrated, or configured in accordance with described embodiments.

FIG. 10 shows a diagrammatic representation of a system 1000 within which embodiments may operate, be installed, integrated, or configured. In accordance with one embodiment, there is a system 1000 having at least a processor 1090 and a memory 1095 therein to execute application code 1085. Such a system 1000 may communicatively interface with and cooperatively execute with the benefit of a hosted computing environment, such as a cloud computing environment as depicted at FIG. 1, as an on-demand service provider, a cloud-based service provider, within a client-server environment, etc.

According to the depicted embodiment, the system 1000 includes the processor 1090 and the memory 1095 to execute instructions at the system 1000; an analytics engine 1050 (e.g., risk evaluator) which provides analytics to generate fraud likelihood score(s) 1043 for transactions handled by the system indicative of a level of risk. A request interface 1025 is enabled to receive incoming requests, for instance, from users and user devices interacting with the system to submit disputes, requests or inquiries for risk explanations, utilize the system's dashboard, etc. The request may be via web interfaces, API calls, etc. An explanation engine 1065 is provided to operate in conjunction with the risk model 1085 from which predicates 1013 are derived indicative of the risk factor(s) for any given purchase transaction. The predicates 1013 or risk characteristics derived from the risk model 1085 may be looped back as inputs into the risk model permitting the analytics engine 1050 to generate simulated fraud likelihood scores which represent a scoring of the predicates as if they represented a purchase transaction and which may be compared to the actual fraud likelihood scores 1043 for purchase transactions handled by the system 1000.

A transmit interface 1035 is enabled to return the requested risk explanations 1014, as well as charts, graphs, alerts, confirmation, status, and other information to users interacting with the system.

Bus 1015 interfaces the various components of the system 1000 amongst each other, with any other peripheral(s) of the system 1000, and with external components such as external network elements, other machines, client devices, cloud computing services, etc. Communications may further include communicating with external devices via a network interface over a LAN, WAN, or the public Internet.

It is therefore in accordance with a particular embodiment that there is a system 1000 to generate a risk explanation for purchase transactions, such a system 1000 having therein: a memory 1095 to store instructions; a processor 1090 to execute the stored instructions; a receive interface 1025 to receive a plurality of purchase transactions for a user at the system 1000; a risk evaluator 1050 to analyze the plurality of purchase transactions via a risk model 1085 to generate a fraud likelihood score 1043 as an output of the risk model 1085, in which a fraud likelihood score 1043 is generated for each one of the plurality of purchase transactions received by the system for the user; the receive interface 1025 to further receive an inquiry 1012 at the system 1000 from the user requesting a risk explanation 1014 for one of the plurality of purchase transactions for the user; the risk evaluator 1050 to further iteratively analyze the one purchase transaction responsive to the inquiry 1012 via the risk model 1085 to identify one or more characteristics and one or more corresponding values for the one or more characteristics which correlate to a highest fraction of the risk model's output for the one purchase transaction for which the risk explanation 1014 is requested by the user; and a transmit interface 1035 to transmit the one or more characteristics and the one or more corresponding values as the risk explanation 1035 to the merchant responsive to the inquiry.

According to another embodiment of system 1000, the transmit interface 1014 is to further transmit a risk explanation GUI to the user for display via a user dashboard.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for generating score output explanations for transactions performed for a user computer system, the method comprising:
processing, by a server computer system over a communications network, a plurality of transactions on behalf of the user computer system;
evaluating, by the server computer system, the plurality of transactions via a machine learning model by generating a score as an output of the machine learning model for each one of the plurality of transactions before authorization or rejection of each one of the plurality of transactions;
in response to a transaction having the score satisfying a threshold, identifying, by the server computer system, an explanation for a rejection of the transaction predicted by the machine learning model by:
iteratively evaluating, by the server computer system, the transaction using the machine learning model to identify one or more transaction features and one or more corresponding values for the one or more transaction features that provide a greatest contribution to the output of the machine learning model for the transaction, wherein the identified one or more transaction features and the one or more corresponding values form an indicator associated with an authorization or rejection of the transaction;
transmitting, by the server computer system to the user computer system over the communications network, the explanation including a subset of the one or more transaction features and the one or more corresponding values as the indicator causing the user computer system to display the indicator generated for the transaction within a graphical user interface (GUI);
receiving, by the server computer system, a user-defined rule modifying a default behavior of the server computer system;
in response to the transaction satisfying the user-defined rule and having the score that satisfies the threshold, overriding, by the server computer system, a default transaction authorization of the transaction;
permitting, by the server computer system, transmission of the transaction at a sampling rate correlated to the score, wherein the sampling rate comprises:
sampling at a first rate when the score is within a low-score grouping;
sampling at a second rate when the score is within an elevated score grouping, wherein the second rate is lower than the first rate; and
sampling at a third rate when the score is in a high score grouping, wherein the third rate is lower than the second rate;
monitoring, by the server computer system, a determination by an issuer computer system, wherein the determination is whether the transaction is determined to be non-fraudulent or fraudulent after being permitted;
determining, by the server computer system, to what extent the user-defined rule is blocking non-fraudulent transactions based on the determination by the issuer computer system; and
training, by the server computer system, the machine learning model based on the extent to which the user-defined rule is blocking non-fraudulent transactions.

2. The method of claim 1, wherein the one or more transaction features and the one or more corresponding values for the one or more transaction features that provide the greatest contribution to the output of the machine learning model for the transaction for which the indicator is generated are identified by:
 generating, by the machine learning model for each of a plurality of transaction features associated with the transaction including a first transaction feature, a first score when a corresponding value of the first transaction feature during the transaction is evaluated by the machine learning model and a second score when a value not corresponding to the first transaction feature during the transaction is evaluated by the machine learning model;
 generating a difference between the first score and the second score; and
 determining an extent to which the first transaction feature contributed to the machine learning model's output for the transaction for which the indicator is generated based on the difference.

3. The method of claim 2, further comprising:
 when the difference between the first score and the second score for the first transaction feature is greater than differences determined for remaining transaction features associated with the transaction, determining that the first transaction feature is an influential contributor to the indicator for the transaction; and
 adding the first transaction feature to the one or more transaction features as at least part of the explanation of the indicator.

4. The method of claim 3, further comprising:
 transmitting the first transaction feature and the corresponding value of the first transaction feature as a primary factor as at least part of the explanation of the indicator to the user computer system.

5. The method of claim 1, wherein the transactions for which the indicator is formed comprises a rejected transaction or a blocked transaction.

6. The method of claim 1, wherein a number of the one or more transaction features and the one or more corresponding values in the subset does not exceed a maximum number of transaction features and corresponding values defined by a user of the user computer system via a dashboard graphical user interface (GUI) rendered at the user computer system.

7. The method of claim 6, further comprising:
 receiving, by the server computer system over the communications network, an inquiry from the user of the user computer system via the dashboard GUI rendered at the user computer system requesting the indicator for the transactions, wherein the maximum number of transaction features is configured by the user via the dashboard GUI; and
 in response to receiving the inquiry, performing the iterative evaluation of the transaction.

8. The method of claim 1, further comprising:
 iteratively analyzing, by the server computer system, one or more additional transactions via the machine learning model to identify one or more negative transactions where fraud is not detected based on analysis of the machine learning model and which have at least one of the one or more transaction features;
 storing, by the server computer system in a data store, the identified one or more negative transactions in a machine learning model training data set; and
 periodically retraining, by the server computer system, the machine learning model based at least in part on a set of transactions in the machine learning model training data set, the set of transactions comprising at least one of the identified one or more negative transactions.

9. The method of claim 1, wherein the machine learning model comprises a plurality of machine learning models that perform an ensemble machine learning model process.

10. The method of claim 1, wherein the one or more transaction features comprise at least a card type feature, a number of uses feature indicative of a number of uses of a card associated with the transaction over a predetermined period of time or transaction location.

11. A non-transitory computer-readable storage medium having instructions stored thereon, which when executed by a computer system, causes the computer system to perform operations for generating indicators for transactions performed for a user system, the operations comprising:
 processing, by a server computer system over a communications network, a plurality of transactions on behalf of the user system;
 evaluating, by the server computer system, the plurality of transactions via a machine learning model by generating a score as an output of the machine learning model for each one of the plurality of transactions before authorization or rejection of each one of the plurality of transactions;
 in response to a transaction having the score satisfying a threshold, identifying, by the server computer system, an explanation for a rejection of the transaction predicted by the machine learning model by:
 iteratively evaluating, by the server computer system, the transaction using the machine learning model to identify one or more transaction features and one or more corresponding values for the one or more transaction features that provide a greatest contribution to the output of the machine learning model for the transaction, wherein the identified one or more transaction features and the one or more corresponding values form an indicator associated with an authorization or rejection of the transaction;
 transmitting, by the server computer system to the user system over the communications network, the explanation including a subset of the one or more transaction features and the one or more corresponding values as the indicator causing the user system to display the indicator generated for the transaction within a graphical user interface (GUI);
 receiving, by the server computer system, a user-defined rule modifying a default behavior of the server computer system;
 in response to the transaction satisfying the user-defined rule and having the score that satisfies the threshold, overriding, by the server computer system, a default transaction authorization of the transaction;
 permitting, by the server computer system, transmission of the transaction at a sampling rate correlated to the score, wherein the sampling rate comprises:
 sampling at a first rate when the score is within a low-score grouping;
 sampling at a second rate when the score is within an elevated score grouping, wherein the second rate is lower than the first rate; and
 sampling at a third rate when the score is in a high score grouping, wherein the third rate is lower than the second rate;
 monitoring, by the server computer system, a determination by an issuer computing system, wherein the determination is whether the transaction is determined to be non-fraudulent or fraudulent after being permitted;

determining, by the server computer system, to what extent the user-defined rule is blocking non-fraudulent transactions based on the determination by the issuer computer system; and training, by the server computer system, the machine learning model based on the extent to which the user-defined rule is blocking non-fraudulent transactions.

12. The non-transitory computer-readable storage medium of claim 11, wherein the one or more transaction features and the one or more corresponding values for the one or more transaction features that provide the greatest contribution to the output of the machine learning model for the transaction for which the indicator is generated are identified by:

generating, by the machine learning model for each of a plurality of transaction features associated with the transaction including a first transaction feature, a first score when a corresponding value of the first transaction feature during the transaction is evaluated by the machine learning model and a second score when a value not corresponding to the first transaction feature during the transaction is evaluated by the machine learning model;

generating a difference between the first score and the second score; and determining an extent to which the first transaction feature contributed to the machine learning model's output for the transaction for which the indicator is generated based on the difference.

13. The non-transitory computer-readable storage medium of claim 11, wherein the transactions for which the indicator is formed comprises a rejected transaction or a blocked transaction.

14. The non-transitory computer-readable storage medium of claim 11, wherein a number of the one or more transaction features and the one or more corresponding values in the subset does not exceed a maximum number of transaction features and corresponding values defined by a user of the user system via a dashboard graphical user interface (GUI) rendered at the user system.

15. The non-transitory computer-readable storage medium of claim 11, further comprising:

iteratively analyzing, by the server computer system, one or more additional transactions via the machine learning model to identify one or more negative transactions where fraud is not detected based on analysis of the machine learning model and which have at least one of the one or more transaction features;

storing, by the server computer system in a data store, the identified one or more negative transactions in a machine learning model training data set; and periodically retraining, by the server computer system, the machine learning model based at least in part on a set of transactions in the machine learning model training data set, the set of transactions comprising at least one of the identified one or more negative transactions.

16. A server computer system to generate indicators for transactions performed for a user system, the server computer system comprising:

a memory to store instructions; and a processor configured to execute stored instructions causing the processor to perform operations comprising:

process, over a communications network, a plurality of transactions on behalf of the user system;

evaluate the plurality of transactions via a machine learning model by generating a score as an output of the machine learning model for each one of the plurality of transactions before authorization or rejection of each one of the plurality of transactions;

in response to a transaction having the score satisfying a threshold, identify an explanation for a rejection of the transaction predicted by the machine learning model by:

iteratively evaluate the transaction using the machine learning model to identify one or more transaction features and one or more corresponding values for the one or more transaction features that provide a greatest contribution to the output of the machine learning model for the transaction, wherein the identified one or more transaction features and the one or more corresponding values form a indicator associated with an authorization or rejection of the transaction;

transmit, to the user system over the communications network, the explanation including a subset of the one or more transaction features and the one or more corresponding values as the indicator causing the user system to display the indicator generated for the transaction within a graphical user interface (GUI);

receive a user-defined rule modifying a default behavior of the server computer system;

in response to the transaction satisfying the user-defined rule and having the score that satisfies the threshold, override a default transaction authorization of the transaction;

permit transmission of the transaction at a sampling rate correlated to the score, wherein the sampling rate comprises:

sampling at a first rate when the score is within a low-score grouping;

sampling at a second rate when the score is within an elevated score grouping, wherein the second rate is lower than the first rate; and sampling at a third rate when the score is in a high score grouping, wherein the third rate is lower than the second rate;

monitor a determination by an issuer computer system, wherein the determination is whether the transaction is determined to be non-fraudulent or fraudulent after being permitted;

determine to what extent the user-defined rule is blocking non-fraudulent transactions based on the determination by the issuer computer system; and train the machine learning model based on the extent to which the user-defined rule is blocking non-fraudulent transactions.

17. The server computer system of claim 16, wherein the processor is configured to identify the one or more transaction features and the one or more corresponding values for the one or more transaction features that provide the greatest contribution to the output of the machine learning model for the transaction for which the indicator is generated, further comprises the processor configured to:

generate, by the machine learning model for each of a plurality of transaction features associated with the transaction including a first transaction feature, a first score when a corresponding value of the first transaction feature during the transaction is evaluated by the machine learning model and a second score when a value not corresponding to the first transaction feature during the transaction is evaluated by the machine learning model;

generate a difference between the first score and the second score; and determine an extent to which the first transaction feature contributed to the machine learning model's output for the transaction for which the indicator is generated based on the difference.

18. The server computer system of claim 16, wherein the transactions for which the indicator is formed comprises a rejected transaction or a blocked transaction.

19. The server computer system of claim 16, wherein a number of the one or more transaction features and the one or more corresponding values in the subset does not exceed a maximum number of transaction features and corresponding values defined by a user of the user system via a dashboard graphical user interface (GUI) rendered at the user system.

20. The server computer system of claim 16, wherein the processor is further configured to:

iteratively analyze one or more additional transactions via the machine learning model to identify one or more negative transactions where fraud is not detected based on analysis of the machine learning model and which have at least one of the one or more transaction features;

store, in a data store, the identified one or more negative transactions in a machine learning model training data set; and periodically retrain the machine learning model based at least in part on a set of transactions in the machine learning model training data set, the set of transactions comprising at least one of the identified one or more negative transactions.

21. The method of claim 1, further comprising:

training, by the server computer system, the machine learning model using at least a portion of transactions within the plurality of transactions selected based on their corresponding to the one or more transaction features and the one or more corresponding values.

22. The method of claim 1, wherein with at least one iteration, the server computer system removes a feature corresponding to an authorized transaction, such that the server computer system analyzes fewer features in a subsequent iteration.

23. The method of claim 1, further comprising:

calculating, by the server computer system, a precision value or a recall value for each feature and its contribution, wherein a feature with the greatest contribution is selected in accordance with its precision value or the recall value.

* * * * *